United States Patent
Kim et al.

(10) Patent No.: US 10,904,901 B2
(45) Date of Patent: *Jan. 26, 2021

(54) METHOD FOR TRANSMITTING AND RECEIVING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Bonghoe Kim, Seoul (KR); Kijun Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,453

(22) Filed: Nov. 27, 2019

(65) Prior Publication Data
US 2020/0100267 A1    Mar. 26, 2020

Related U.S. Application Data

(63) Continuation of application No. 15/743,940, filed as application No. PCT/KR2016/009191 on Aug. 19, 2016, now Pat. No. 10,582,524.

(60) Provisional application No. 62/207,943, filed on Aug. 21, 2015.

(51) Int. Cl.
*H04W 72/12*  (2009.01)
*H04W 28/02*  (2009.01)
(Continued)

(52) U.S. Cl.
CPC .......... *H04W 72/1226* (2013.01); *H04B 7/06* (2013.01); *H04B 7/0626* (2013.01);
(Continued)

(58) Field of Classification Search
CPC . H04W 72/1226; H04W 40/12; H04W 76/10; H04W 76/15; H04W 28/0231; H04W 28/0215; H04W 4/70
See application file for complete search history.

(56) References Cited

U.S. PATENT DOCUMENTS

| 2009/0170442 A1 | 7/2009 | Asanuma et al. |
| 2012/0067663 A1 | 3/2012 | Kiyoshima et al. |

(Continued)

OTHER PUBLICATIONS

Huawei et al., "On the use of periodic CSI," R1-153208, 3GPP TSG RAN WG1 Meeting #81, Fukuoka, Japan, May 25-29, 2015, 3 pages.
(Continued)

*Primary Examiner* — Ashley Shivers
(74) *Attorney, Agent, or Firm* — Birch, Stewart, Kolasch & Birch, LLP

(57) ABSTRACT

A method of reporting channel state information (CSI) at a machine type communication (MTC) user equipment (UE) in a wireless communication system, includes selecting a set of M downlink subframes as a CSI reference resource and a subband among a set of N subbands; measuring a wideband channel quality indicator (CQI) for the set of N subbands and a subband CQI for the subband through the CSI reference resource; and transmitting, to a base station, the wideband CQI and the subband CQI through an uplink subframe, wherein the MTC UE measures the wideband CQI and the subband CQI based on a cell-specific reference signal (CRS) received through the M downlink subframes which are located before the uplink subframe, and wherein the set of N subbands is configured to perform frequency hopping.

15 Claims, 13 Drawing Sheets

(51) Int. Cl.
- *H04W 40/12* (2009.01)
- *H04W 76/15* (2018.01)
- *H04W 4/70* (2018.01)
- *H04B 7/06* (2006.01)
- *H04L 1/06* (2006.01)
- *H04L 5/00* (2006.01)
- *H04L 1/08* (2006.01)
- *H04L 1/00* (2006.01)

(52) U.S. Cl.
CPC ......... *H04B 7/0632* (2013.01); *H04L 1/0026* (2013.01); *H04L 1/0028* (2013.01); *H04L 1/06* (2013.01); *H04L 1/08* (2013.01); *H04L 5/0012* (2013.01); *H04L 5/0057* (2013.01); *H04W 28/0215* (2013.01); *H04W 40/12* (2013.01); *H04W 76/15* (2018.02); *H04L 5/0005* (2013.01); *H04W 4/70* (2018.02)

(56) References Cited

U.S. PATENT DOCUMENTS

| | | |
|---|---|---|
| 2015/0009848 A1 | 1/2015 | Miki et al. |
| 2016/0135143 A1 | 5/2016 | Won et al. |
| 2017/0048039 A1 | 2/2017 | Zhao et al. |

OTHER PUBLICATIONS

LG Electronics, "Discussion on PDSCH transmission for MTC," R1-152701, 3GPP TSG RAN WG1 Meeting #81, Fukuoka, Japan, May 25-29, 2015, pp. 1-9.

Mediatek Inc., "CQI definition for Rel-13 MTC," R1-154717, 3GPP TSG RAN WG1 Meeting #82, Beijing, China, Aug. 24-28, 2015, 4 pages.

Panasonic, "CSI report/measurement in MTC," R1-153971, 3GPP TSG RAN WG1 Meeting #82, Beijing, China, Aug. 24-28, 2015, pp. 1-3.

ZTE, "Considerations on CSI feedback for MTC enhancement," R1-154046, 3GPP TSG RAN WG1 Meeting #82, Beijing, China, Aug. 24-28, 2015, 5 pages.

FIG. 9
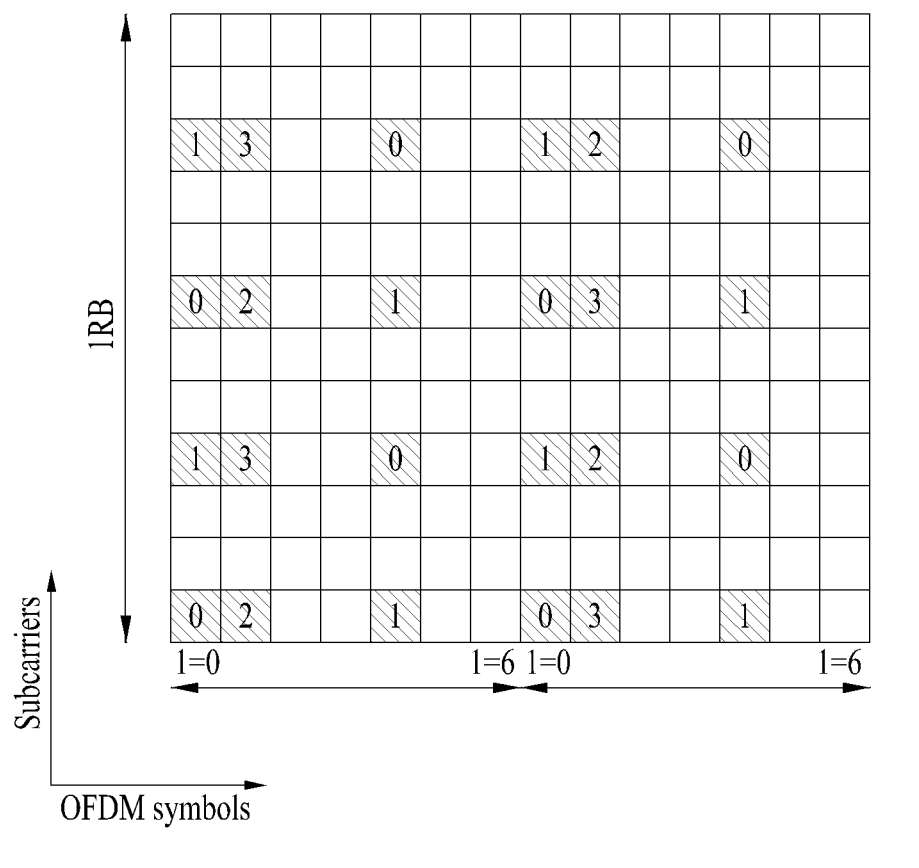
 : CRS for antrnna port p (p∈0, p∈0,1 or p∈0,1,2,3)

METHOD FOR TRANSMITTING AND RECEIVING CHANNEL STATE INFORMATION IN WIRELESS COMMUNICATION SYSTEM AND APPARATUS THEREFOR

CROSS REFERENCE TO RELATED APPLICATIONS

This application a Continuation of U.S. patent application Ser. No. 15/743,940 filed on Jan. 11, 2018 (now U.S. Pat. No. 10,582,524, Issued on Mar. 3, 2020), which is the National Phase of PCT International Application No. PCT/KR2016/009191, filed on Aug. 19, 2016, which claims priority under 35 U.S.C. 119(e) to U.S. Provisional Application No. 62/207,943, filed on Aug. 21, 2015, all of these applications are hereby expressly incorporated by reference into the present application.

BACKGROUND OF THE INVENTION

Field of the Invention

The present invention relates to a method of transmitting or receiving a channel state information report in a wireless communication system supporting machine type communication (MTC), and an MTC user equipment (UE) and a base station for performing the same.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

SUMMARY OF THE INVENTION

An object of the present invention is to provide a method of more efficiently or accurately measuring and transmitting or receiving channel state information in a wireless communication system supporting MTC and an apparatus for performing the same.

Technical tasks obtainable from the present invention are non-limited the above mentioned technical tasks and other unmentioned technical tasks can be clearly understood from the following description by those having ordinary skill in the technical field to which the present invention pertains.

The object of the present invention can be achieved by providing a method of reporting channel state information (CSI) at a machine type communication (MTC) user equipment (UE) in a wireless communication system including selecting a set of M downlink subframes as a CSI reference resource for the MTC UE, measuring a channel quality indicator (CQI) through the CSI reference resource and transmitting a CSI report including the CQI to a base station through an uplink subframe, wherein the MTC UE is configured to repeatedly receive an MTC signal by frequency hopping N subbands among a plurality of subbands, wherein 'M' which is a number of downlink subframes to be included in the CSI reference resource is determined based on a higher layer parameter received from the base station, and wherein the MTC UE measures the CQI based on a cell-specific reference signal (CRS) received through the M downlink subframes selected from a reference downlink subframe located before the uplink subframe.

In another aspect of the present invention, provided herein is a machine type communication (MTC) user equipment (UE) for reporting channel state information (CSI) in a wireless communication system including a processor for selecting a set of M downlink subframes as a CSI reference resource for the MTC UE and measuring a channel quality indicator (CQI) through the CSI reference resource and a transmitter for transmitting a CSI report including the CQI to a base station through an uplink subframe, wherein the MTC UE is configured to repeatedly receive an MTC signal by frequency hopping N subbands among a plurality of subbands, wherein 'M' which is a number of downlink subframes to be included in the CSI reference resource is determined based on a higher layer parameter received from the base station, and wherein the processor measures the CQI based on a cell-specific reference signal (CRS) received through the M downlink subframes selected from a reference downlink subframe located before the uplink subframe.

In another aspect of the present invention, provided herein is a method of receiving a channel state information (CSI) report at a base station from a machine type communication (MTC) user equipment (UE) in a wireless communication system including transmitting a cell-specific reference signal (CRS) through downlink subframes, and receiving a CSI report including a channel quality indicator (CQI) measured in a CSI reference resource from the MTC UE through an uplink subframe, wherein the base station repeatedly transmits an MTC signal by frequency hopping N subbands among a plurality of subbands, wherein the CSI reference resource is configured as M downlink subframes among the downlink subframes in which the CRS is transmitted, wherein 'M' which is a number of downlink subframes included in the CSI reference resource is determined based on a higher layer parameter transmitted by the base station, and wherein the CQI is measured based on a cell-specific reference signal (CRS) transmitted through the M downlink subframes selected from a reference downlink subframe located before the uplink subframe.

In another aspect of the present invention, provided herein is a base station apparatus for performing the method of receiving the CSI report.

The M downlink subframes included in the CSI reference resource may be valid downlink subframes.

The reference downlink subframe may be located before the uplink subframe by at least four subframes.

The CQI may be measured with respect to all of the N subbands.

The CQI may be measured with respect to any one of the N subbands.

The measuring of the CQI may include measuring the CQI by assuming that the same redundancy version is applied to the M downlink subframes when one physical downlink shared channel (PDSCH) transport block is repeatedly received through the M downlink subframes.

The measuring of the CQI may include measuring the CQI by assuming that the same redundancy version is 0 and rank between the base station and the MTC UE is always 1.

The measuring of the CQI may include selecting a highest CQI index value from among predetermined CQI indices in which an error probability of the PDSCH transport block does not exceed 0.1, when the PDSCH transport block is repeatedly received through the M downlink subframes.

According to embodiments of the present invention, since a CSI reference resource is configured to include M subframes in consideration of repeated transmission properties of an MTC signal in a wireless communication system supporting MTC, channel state information may be more efficiently and accurately measured and reported.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 9 is a conceptual diagram illustrating Cell-specific Reference Signal (CRS).

DETAILED DESCRIPTION OF THE EMBODIMENTS

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). 3rd Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.16m system) without restriction.

Figure 1:
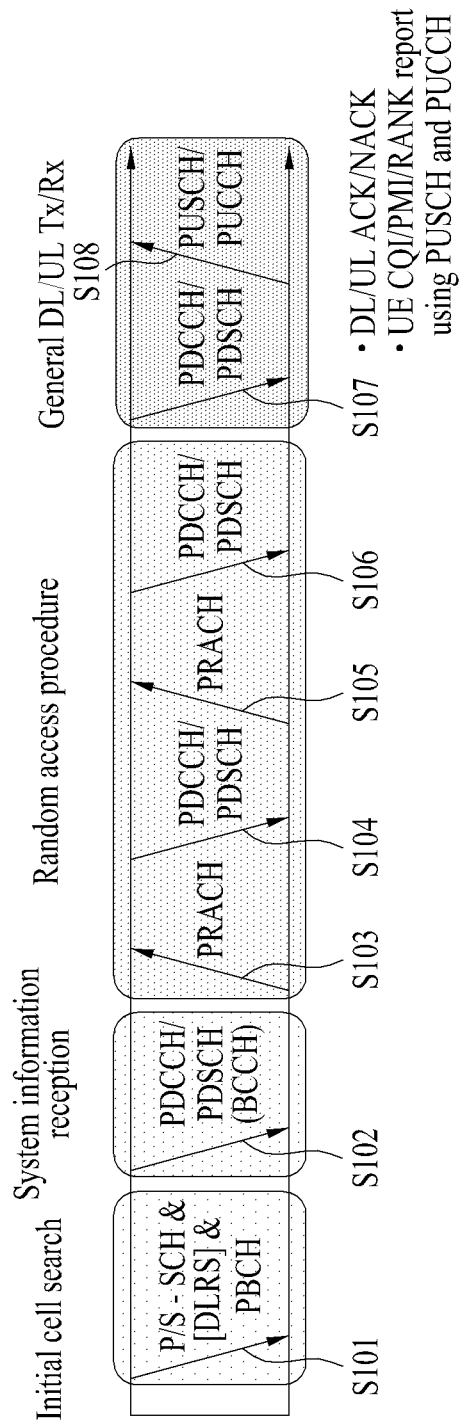
FIG. 1 illustrates physical channels and a general signal transmission method using the physical channels in a Long Term Evolution(-Advanced) (LTE-(A)) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
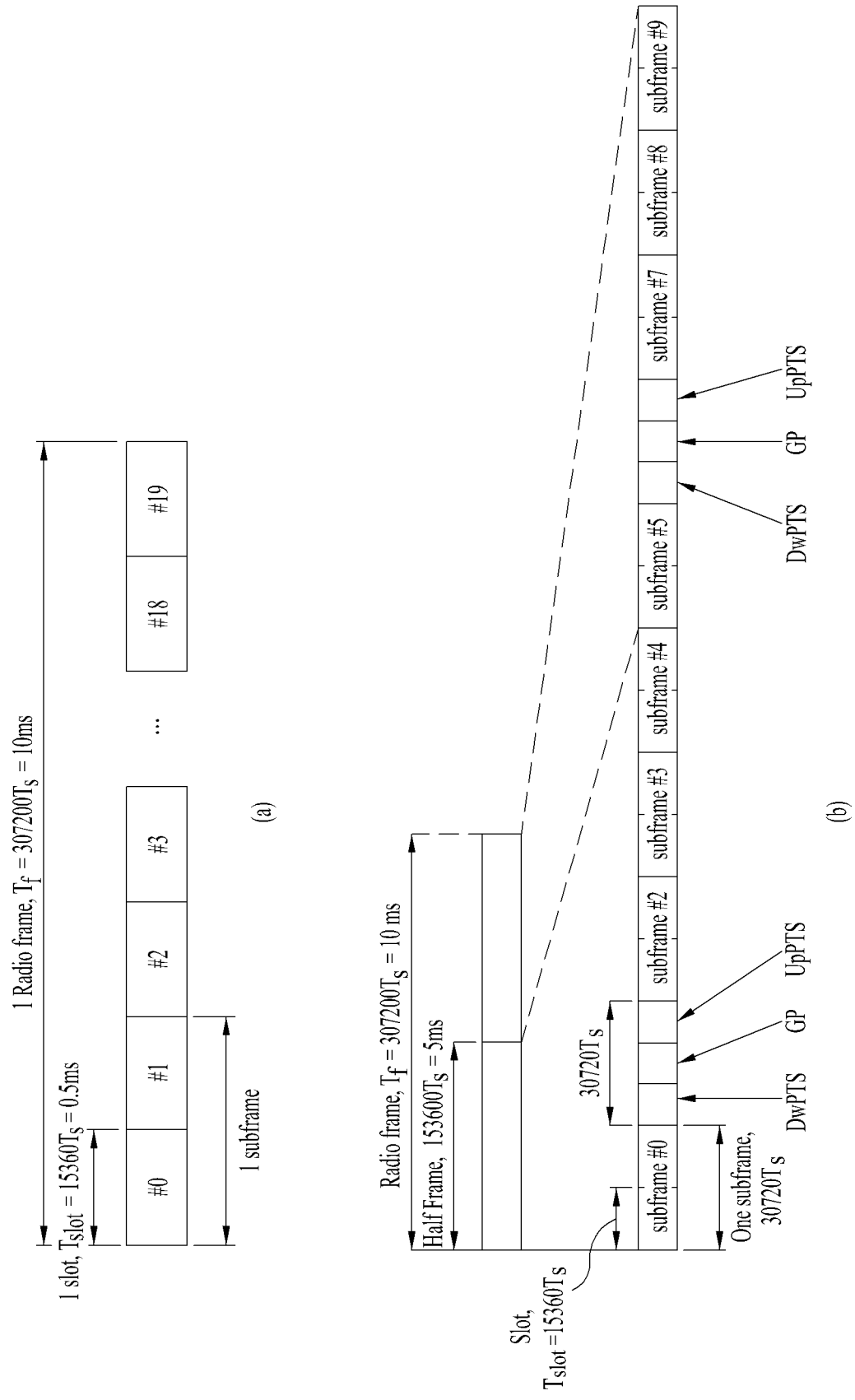
FIG. 2 illustrates a radio frame structure in the LTE(-A) system.

FIG. 2 illustrates a radio frame structure in the LTE(-A) system. The 3GPP LTE standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL) SC-FDMA symbols in the time domain. Unless specifically mentioned, "OFDM symbol" or "SC-FDMA" symbol may be referred to simply as "symbol" (hereinafter referred to as 'sym').

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). In the special subframe, DwPTS is used for initial cell search, synchronization, or channel estimation at a UE. UpPTS is used for an eNB to perform channel estimation and acquire UL synchronization with a UE. The GP is used to cancel UL interference between a UL and a DL, caused by the multi-path delay of a DL signal. A subframe includes two slots.

[Table 1] lists exemplary subframe configurations for a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D represents a DL subframe, U represents a UL subframe, and S represents a special subframe.

Figure 3:
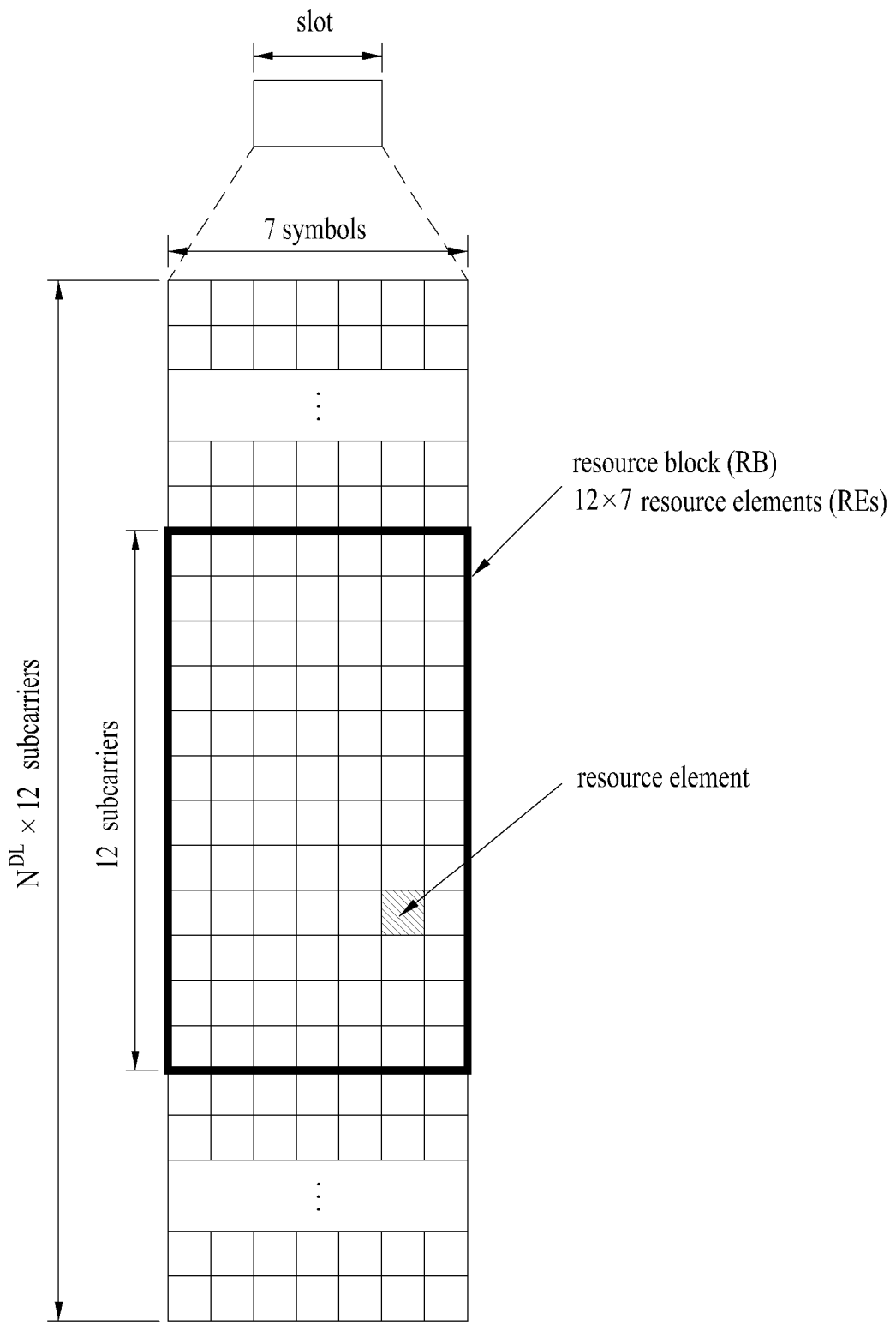
FIG. 3 illustrates a resource grid for the duration of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
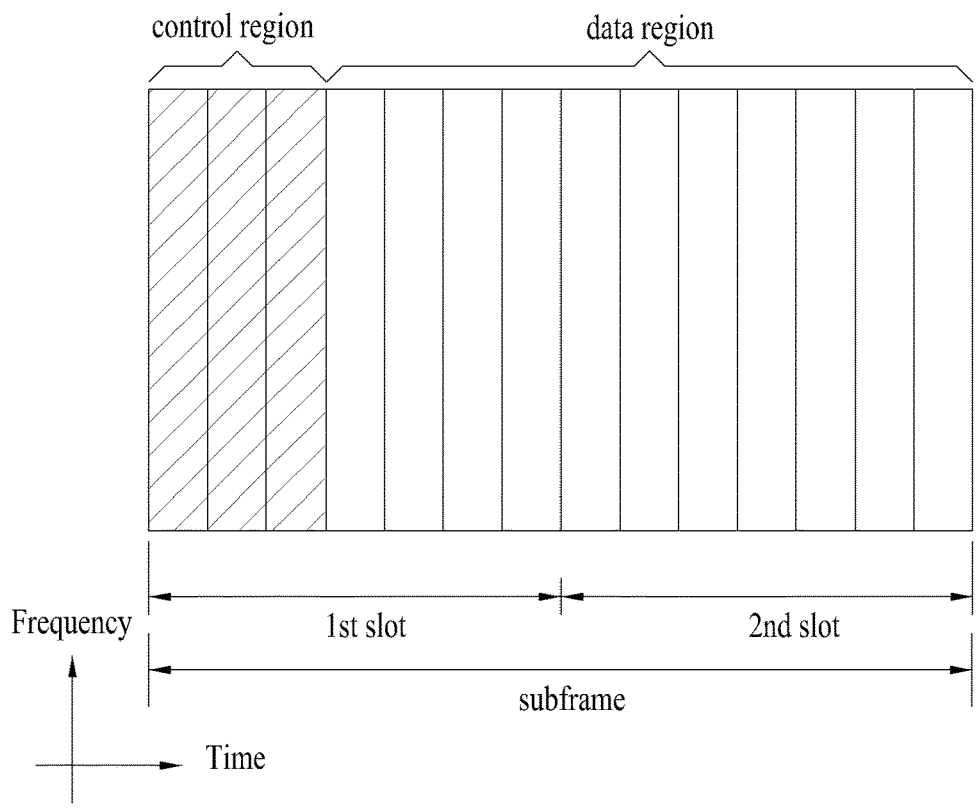
FIG. 4 illustrates an exemplary Downlink (DL) SubFrame (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc.

The PCFICH is located in the first OFDM symbol of a subframe, carrying information about the number of OFDM symbols used for transmission of control channels in the subframe. The PHICH occupies 4 RE Groups (REGs) distributed equally in the control region based on a cell Identifier (ID). The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission. The PHICH is allocated to the remaining REGs of one or more OFDM symbols corresponding to a PHICH duration, except for REGs carrying Cell-specific Reference Signals (CRSs) and the PCFICH (the first OFDM symbol). The PHICH is allocated to 3 REGs distributed as much as possible in the frequency domain.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of REGs. The format of a PDCCH and the number of available bits for the PDCCH are determined according to the number of CCEs.

[Table 2] lists the number of CCEs, the number of REGs, and the number of PDCCH bits for each PDCCH format.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCEs may be numbered consecutively and a PDCCH having a format with n CCEs may start only at a CCE with an index being a multiple of n. The number of CCEs used for transmission of a specific PDCCH is determined according to a channel condition by an eNB. For example, if the PDCCH is for a UE having a good DL channel (e.g., a UE near to the eNB), one CCE may be sufficient for the PDCCH. On the other hand, if the PDCCH is for a UE having a poor channel (e.g., a UE near to a cell edge), 8 CCEs may be used for the PDCCH in order to achieve sufficient robustness. In addition, the power level of the PDCCH may be controlled according to the channel condition.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) request, an HARQ process number, a Transmitted Precoding Matrix Indicator (TPMI), Precoding Matrix Indicator (PMI) confirmation, etc.

An eNB determines a PDCCH format according to control information to be transmitted to a UE and adds a Cyclic Redundancy Check (CRC) to the control information, for error detection. The CRC is masked by an ID (e.g., a Radio Network Temporary Identifier (RNTI)) according to the owner or usage of a PDCCH. In other words, the PDCCH is CRC-scrambled with the ID (e.g., the RNTI).

[Table 3] lists exemplary IDs by which a PDCCH is masked.

TABLE 3

| Type | Identifier | Description |
| --- | --- | --- |
| UE-specific | C-RNTI, TC-RNTI, SPS C-RNTI | used for a unique UE identification |
| Common | P-RNTI | used for paging message |
| | SI-RNTI | used for system information |
| | RA-RNTI | used for random access response |

If a C-RNTI, a Temporary C-RNTI (TC-RNTI), and a Semi-Persistent Scheduling C-RNTI (SPS C-RNTI) are used, the PDCCH delivers UE-specific control information for a specific UE. If other RNTIs are used, the PDCCH delivers common control information for all UEs in a cell.

The LTE(-A) standard defines the CCE positions of a limited set (equivalent to a limited CCE set or a limited PDCCH candidate set) in which a PDCCH may be located, for each UE. The CCE positions of a limited set that a UE should monitor to detect a PDCCH directed to the UE may be referred to as a Search Space (SS). Monitoring includes decoding each PDCCH candidate (blind decoding). A UE-specific Search Space (USS) and a Common Search Space (CSS) are defined. A USS is configured on a UE basis and a CSS is configured commonly for UEs. The USS and the CSS may be overlapped. The starting position of the USS hops between subframes UE-specifically. An SS may have a different size according to a PDCCH format.

[Table 4] lists CSS sizes and USS sizes.

TABLE 4

| PDCCH format | Number of CCEs (n) | Number of PDCCH candidates in CSS | Number of PDCCH candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To place computation load under control according to the total number of Blind Decodings (BDs), a UE is not required to detect all defined DCI formats at the same time. In general, the UE always detects formats 0 and 1A in a USS. Formats 0 and 1A have the same size and are distinguished from each other by a flag in a message. The UE may be required to receive an additional format (e.g., format 1, 1B, or 2 according to a PDSCH Transmission Mode (TM) configured by an eNB). The UE detects formats 1A and 1C in a CSS. The UE may further be configured to detect format 3 or 3A. Formats 3 and 3A have the same size as formats 0 and 1A and may be identified by scrambling a CRC with different IDs (or a common ID), instead of UE-specific IDs.

PDSCH transmission schemes according to TMs and information content of DCI formats are given as follows.

TMs
TM 1: transmission from a single eNB antenna port
TM 2: transmit diversity
TM 3: open-loop spatial multiplexing
TM 4: closed-loop spatial multiplexing
TM 5: Multi-User Multiple Input Multiple Output (MU-MIMO)
TM 6: closed-loop rank-1 precoding
TM 7: single-antenna port (port 5) transmission
TM 8: double-layer transmission (port 7 and port 8) or single-antenna port (port 7 or port 8) transmission
TMs 9 and 10: up to 8-layer transmission (port 7 to port 14) or single-antenna port (port 7 or port 8) transmission DCI formats
format 0: resource grant for PUSCH transmission
format 1: resource allocation for single-codeword PDSCH transmission (TMs 1, 2 and 7)
format 1A: compact signaling of resource allocation for single-codeword PDSCH (all modes)
format 1B: compact resource allocation for PDSCH (mode 6) using rank-1 closed-loop precoding
format 1C: very compact resource allocation for PDSCH (e.g., paging/broadcast system information)
format 1D: compact resource allocation for PDSCH using MU-MIMO (mode 5)
format 2: resource allocation for PDSCH of closed-loop MIMO operation (mode 4)
format 2A: resource allocation for PDSCH of open-loop MIMO operation (mode 3)
format 3/3A: power control command having 2-bit/1-bit power control value for PUCCH and PUSCH
format 4: resource grant for PUSCH transmission in a cell set to multi-antenna port transmission mode DCI formats may be classified into a TM-dedicated format and a TM-common format. The TM-dedicated format is a DCI format configured for a corresponding TM only, and the TM-common format is a DCI format configured commonly for all TMs. For example, DCI format 2B may be a TM-dedicated DCI format for TM 8, DCI format 2C may be a TM-dedicated DCI format for TM 9, and DCI format 2D may be a TM-dedicated DCI format for TM 10. DCI format 1A may be a TM-common DCI format.

Figure 5:
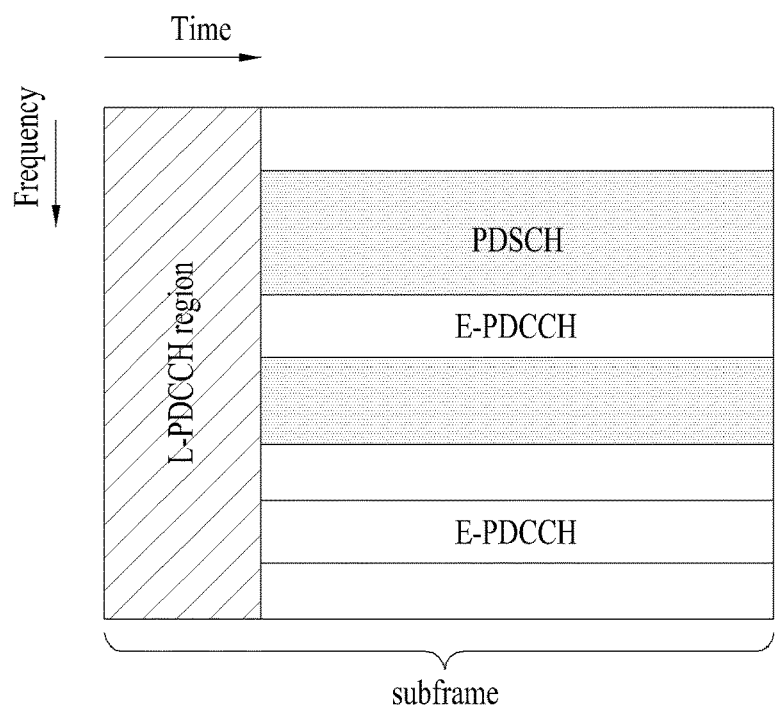
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). An L-PDCCH region means a region to which an L-PDCCH may be allocated. The L-PDCCH region may refer to a control region, a control channel resource region (i.e., CCE resources) to which a PDCCH may be actually allocated, or a PDCCH SS depending on the context. A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

Specifically, the E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated. The E-PDCCH may be configured only in a USS. A UE may attempt to detect DCI only in an L-PDCCH CSS and an E-PDCCH USS in a subframe allowed to carry an E-PDCCH (hereinafter, an E-PDCCH subframe) and in an L-PDCCH CSS and an L-PDCCH USS in a subframe not allowed to carry an E-PDCCH (hereinafter, a non-E-PDCCH subframe).

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH. In the legacy LTE system, a PDCCH candidate region (a PDCCH SS) is reserved in a control region and a PDCCH for a specific UE is transmitted in a part of the PDCCH SS. Therefore, a UE may detect its PDCCH in the PDCCH SS by blind decoding. Similarly, an E-PDCCH may also be transmitted in all or a part of reserved resources.

Figure 6:
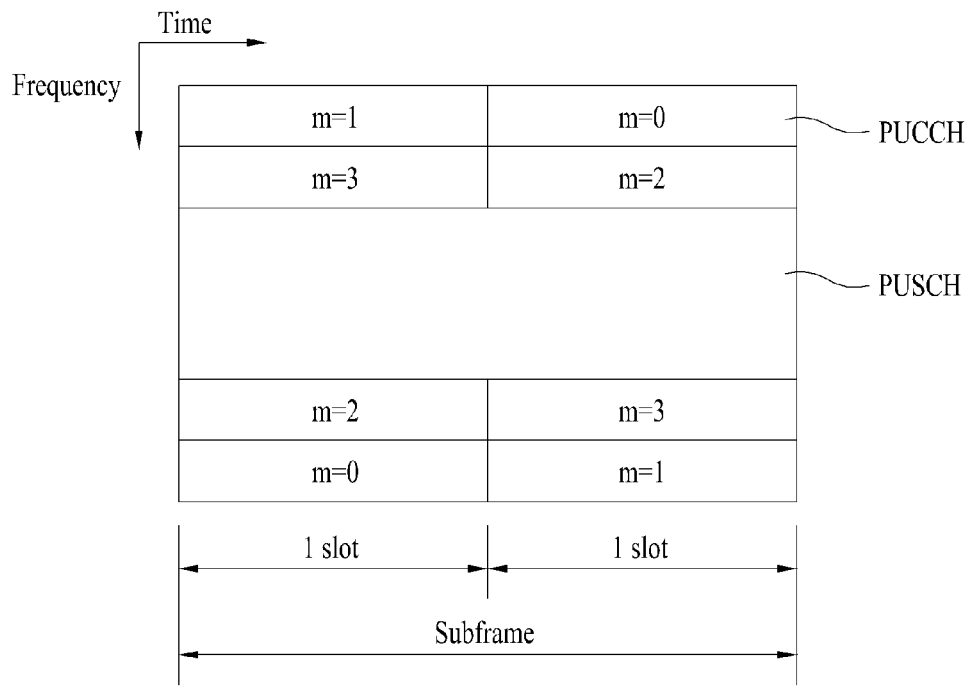
FIG. 6 illustrates an Uplink (UL) SF structure.

FIG. 6 illustrates a structure of a UL subframe in the LTE system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.
Scheduling Request (SR): information used to request UL-SCH resources. The SR is transmitted in On-Off Keying (OOK).
HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. An HARQ ACK/NACK and an HARQ-ACK may be interchangeably used in the same meaning of an HARQ response.
Channel Quality Indicator (CSI): feedback information for a DL channel. MIMO-related feedback information includes an RI and a PMI. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

[Table 5] illustrates a mapping relationship between PUCCH formats and UCI in the LTE system.

TABLE 5

| PUCCH format | Uplink Control Information (UCI) |
|---|---|
| format 1 | SR(Scheduling Request) (non-modulated waveform) |
| format 1a | bit HARQ ACK/NACK (SR present/absent) |
| format 1b | bit HARQ ACK/NACK (SR present/absent) |
| format 2 | CQI (20 coded bits) |
| format 2 | CQI and 1- or 2-bit HARQ ACK/NACK (20 bits) (only in case of extended CP) |
| format 2a | CQI and 1-bit HARQ ACK/NACK (20 + 1 coded bits) |
| format 2b | CQI and 2-bit HARQ ACK/NACK (20 + 2 coded bits) |

Figure 7:
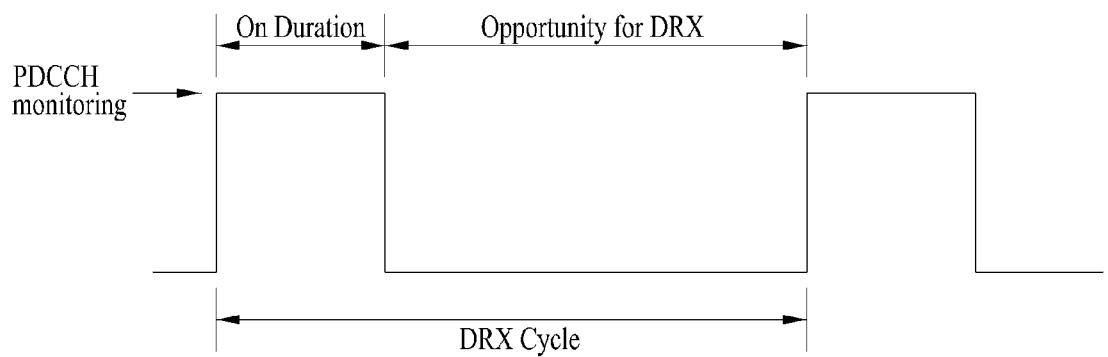
FIG. 7 is a conceptual diagram illustrating exemplary Discontinuous Reception (DRX).

FIG. 7 is a conceptual diagram illustrating Discontinuous Reception (DRX). User equipment (UE) may perform DRX to reduce power consumption. DRX may control PDCCH monitoring activation of the UE. Referring to FIG. 7, the DRX period may include one period denoted by "On duration" and the other period denoted by "Opportunity for DRX". In more detail, the UE may monitor PDCCH for the "On duration" period, and may not perform PDCCH monitoring during the "Opportunity for DRX" period. The PDCCH monitoring may include monitoring C-RNTI, TPC-PUCCH-RNTI, and TPC-PUSCH-RNT of the UE, and may further include monitoring SPS (Semi-Persistent Scheduling) C-RNTI of the UE (when configuration is achieved). If the UE is in the RRC (Radio Resource Control) CONNECTED state and DRX is configured, the UE may perform discontinuous monitoring of PDCCH according to the DRX operation. Otherwise, the UE may perform continuous monitoring of the PDCCH. "onDurationTimer" and DRX cycle may be configured through RRC signaling (i.e., higher layer signaling). "onDurationTimer" may denote the number of successive PDCCH-subframes starting from the start time of the DRX cycle. In FDD, the PDCCH subframe may denote all subframes. In TDD, the PDCCH subframe may denote a subframe including both a downlink (DL) subframe and a DwPTS.

Figure 8:
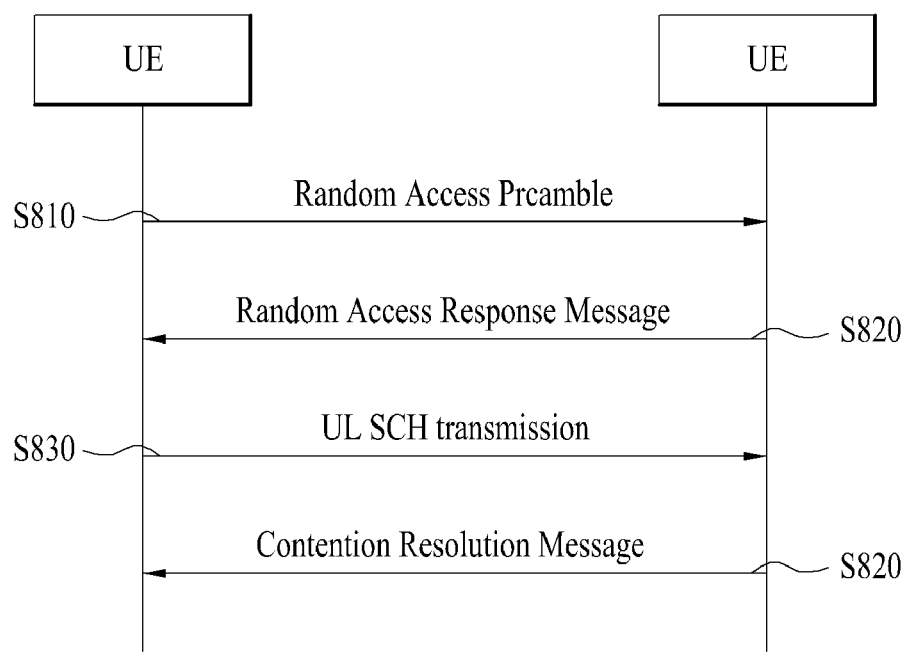
FIG. 8 is a conceptual diagram illustrating a Random Access Procedure (RAP).

FIG. 8 illustrates a random access procedure. The random access procedure is used to transmit UL short data. For example, upon occurrence of initial access in Radio Resource Control (RRC) IDLE mode, initial access after Radio Link Failure (RLF), or handover requiring random access, or upon generation of UL/DL data requiring random access in RRC_CONNECTED mode, the random access procedure is performed. The random access procedure is performed in a contention-based manner or a non-contention-based manner.

Referring to FIG. 8, a UE receives random access information from an eNB by system information and stores the received random access information. Subsequently, when random access is needed, the UE transmits a random access preamble (message 1 or Msg1) to the eNB on a PRACH (S810). Upon receipt of the random access preamble from the UE, the eNB transmits a random access response message (message 2 or Msg2) to the UE (S820). Specifically, DL scheduling information for the random access response message is CRC-masked by a Random Access-RNTI (RA-RNTI) and transmitted on a PDCCH. Upon receipt of the DL scheduling signal masked by the RA-RNTI, the UE may receive the random access response message on a PDSCH. Then, the UE determines whether a Random Access Response (RAR) directed to the UE is included in the random access response message. The RAR includes a Timing Advance (TA), UL resource allocation information (a UL grant), a temporary UE ID, etc. The UE transmits a UL-SCH message (message 3 or Msg3) to the eNB according to the UL grant (S830). After receiving the UL-SCH message, the eNB transmits a contention resolution message (message 4 or Msg4) to the UE (S840).

FIG. 9 is a conceptual diagram illustrating a CRS. Referring to FIG. 9, CRS may be transmitted through the antenna ports 0-3. One antenna (P=0), two antennas (P=0, 1), or four antennas (P=0, 1, 2, 3) may be supported according to base stations (BSs). FIG. 9 illustrates the CRS structure used when a maximum of 4 antennas is supported. In the LTE system, CRS is used not only for demodulation but also for measurement. CRS may be transmitted throughout the entire band in all DL subframes supporting PDSCH transmission, and may be transmitted through all antenna ports configured in the BS. In the meantime, CRS is transmitted through the entire band for each subframe, resulting in high RS overhead.

Channel Status Information Feedback

In the 3GPP LTE system, when a DL reception entity (e.g., UE) is coupled to a DL transmission entity (e.g., eNB), a Reference Signal Received Power (RSRP) and a Reference Signal Received Quality (RSRQ) that are transmitted via downlink are measured at an arbitrary time, and the measured result may be periodically or event-triggeredly reported to the eNB.

In a cellular OFDM wireless packet communication system, each UE may report DL channel information based on a DL channel condition via uplink, and the eNB may determine time/frequency resources and MCS (Modulation and Coding Scheme) so as to transmit data to each UE using DL channel information received from each UE.

In case of the legacy 3GPP LTE system (e.g., 3GPP LTE Release-8 system), such channel information may be composed of Channel Quality Indication (CQI), Precoding Matrix Indicator (PMI), and Rank Indication (RI). All or some of CQI, PMI and RI may be transmitted according to a transmission mode of each UE. CQI may be determined by the received signal quality of the UE. Generally, CQI may be determined on the basis of DL RS measurement. In this case, a CQI value actually applied to the eNB may correspond to an MCS in which the UE maintains a Block Error Rate (BLER) of 10% or less at the measured Rx signal quality and at the same time has a maximum throughput or performance.

In addition, such channel information reporting scheme may be divided into periodic reporting and aperiodic reporting upon receiving a request from the eNB.

Information regarding the aperiodic reporting may be assigned to each UE by a CQI request field of 1 bit contained in uplink scheduling information sent from the eNB to the UE. Upon receiving the aperiodic reporting information, each UE may transmit channel information considering the UE's transmission mode to the eNB over a physical uplink shared channel (PUSCH). If necessary, RI and CQI/PMI may not be transmitted over the same PUSCH.

In case of the aperiodic reporting, a cycle in which channel information is transmitted via an upper layer signal, an offset of the corresponding period, etc. may be signaled to each UE in units of a subframe, and channel information considering a transmission (Tx) mode of each UE may be transmitted to the eNB over a physical uplink control channel (PUCCH) at intervals of a predetermined time. In the case where UL transmission data is present in a subframe to which channel information is transmitted at intervals of a predetermined time, the corresponding channel information may be transmitted together with data over not a PUCCH but a PUSCH together. In case of the periodic reporting over a PUCCH, a limited number of bits may be used as compared to PUSCH. RI and CQI/PMI may be transmitted over the same PUSCH.

If the periodic reporting collides with the aperiodic reporting, only the aperiodic reporting may be performed within the same subframe.

In order to calculate a WB CQI/PMI, the latest transmission RI may be used. In a PUCCH reporting mode, RI may be independent of another RI for use in a PUSCH reporting mode. RI may be effective only at CQI/PMI for use in the corresponding PUSCH reporting mode.

The CQI/PMI/RI feedback type for the PUCCH reporting mode may be classified into several feedback types. Type 1 is a CQI feedback for a user-selected subband. Type 2 is a WB CQI feedback and a WB PMI feedback. Type 3 is an RI feedback. Type 4 is a WB CQI feedback. Type 5 is RI and WB PMI feedback. Type 6 is RI and PTI feedback.

Referring to Table 6, in the case of periodic reporting of channel information, a reporting mode is classified into four reporting modes (Modes 1-0, 1-1, 2-0 and 2-1) according to CQI and PMI feedback types.

TABLE 6

|  |  | PMI Feedback Type | |
| --- | --- | --- | --- |
|  |  | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
|  | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

The reporting mode is classified into a wideband (WB) CQI and a subband (SB) CQI according to a CQI feedback type. The reporting mode is classified into a No-PMI and a Single PMI according to transmission or non-transmission of PMI. As can be seen from Table 5, 'NO PMI' may correspond to an exemplary case in which an Open Loop (OL), a Transmit Diversity (TD), and a single antenna are used, and 'Single PMI' may correspond to an exemplary case in which a closed loop (CL) is used.

Mode 1-0 may indicate an exemplary case in which PMI is not transmitted but WB CQI is transmitted only. In case of Mode 1-0, RI may be transmitted only in the case of Spatial Multiplexing (SM), and one WB CQI denoted by 4 bits may be transmitted. If RI is higher than '1', a CQI for a first codeword may be transmitted. In case of Mode 1-0, Feedback Type 3 and Feedback Type 4 may be multiplexed at different time points within the predetermined reporting period, and then transmitted. The above-mentioned Mode 1-0 transmission scheme may be referred to as Time Division Multiplexing (TDM)-based channel information transmission.

Mode 1-1 may indicate an exemplary case in which a single PMI and a WB CQI are transmitted. In this case, 4-bit WB CQI and 4-bit WB PMI may be transmitted simultaneously with RI transmission. In addition, if RI is higher than '1', 3-bit WB Spatial Differential CQI may be transmitted. In case of transmission of two codewords, the WB spatial differential CQI may indicate a differential value between a WB CQI index for Codeword 1 and a WB CQI index for Codeword 2. These differential values may be assigned to the set {−4, −3, −2, −1, 0, 1, 2, 3}, and each differential value may be assigned to any one of values contained in the set and be represented by 3 bits. In case of Mode 1-1, Feedback Type 2 and Feedback Type 3 may be multiplexed at different time points within the predetermined reporting period, and then transmitted.

Mode 2-0 may indicate that no PMI is transmitted and a CQI of a UE-selected band is transmitted. In this case, RI may be transmitted only in case of an open loop spatial multiplexing (OL SM) only, a WB CQI denoted by 4 bits may be transmitted. In each Bandwidth Part (BP), Best-1 CQI may be transmitted, and Best-1 CQI may be denoted by 4 bits. In addition, an indicator of L bits indicating Best-1 may be further transmitted. If RI is higher than '1', CQI for a first codeword may be transmitted. In case of Mode 2-0, the above-mentioned feedback type 1, feedback type 3, and feedback type 4 may be multiplexed at different time points within a predetermined reporting period, and then transmitted.

Mode 2-1 may indicate an exemplary case in which a single PMI and a CQI of a UE-selected band are transmitted. In this case, WB CQI of 4 bits, WB spatial differential CQI of 3 bits, and WB PMI of 4 bits are transmitted simultaneously with RI transmission. In addition, a Best-1 CQI of 4 bits and a Best-1 indicator of L bits may be simultaneously transmitted at each bandwidth part (BP). If RI is higher than '1', a Best-1 spatial differential CQI of 3 bits may be transmitted. During transmission of two codewords, a differential value between a Best-1 CQI index of Codeword 1 and a Best-1 CQI index of Codeword 2 may be indicated. In Mode 2-1, the above-mentioned feedback type 1, feedback 2, and feedback type 3 may be multiplexed at different time points within a predetermined reporting period, and then transmitted.

In the UE selected SB CQI reporting mode, the size of BP (Bandwidth Part) subband may be defined by the following table 7.

TABLE 7

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Table 7 shows a bandwidth part (BP) configuration and the subband size of each BP according to the size of a system bandwidth. UE may select a preferred subband within each BP, and calculate a CQI for the corresponding subband. In Table 7, if the system bandwidth is set to 6 or 7, this means no application of both the subband size and the number of bandwidth parts (BPs). That is, the system bandwidth of 6 or 7 means application of only WB CQI, no subband state, and a BP of 1.

Figure 10:
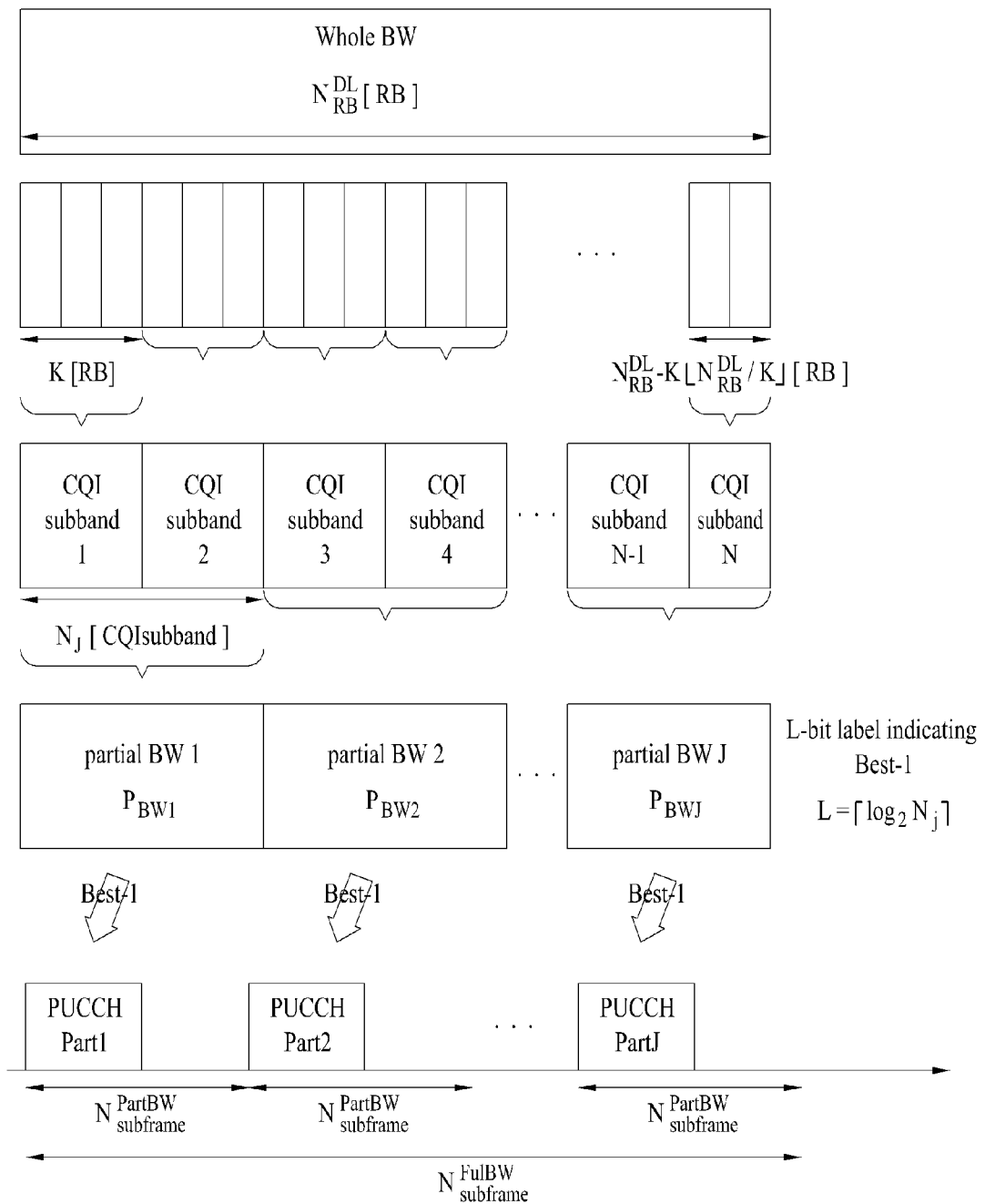
FIG. 10 is a diagram illustrating a UE selected CQI report mode.

FIG. 10 shows an example of a UE selected CQI reporting mode.

$N_{RB}^{DL}$ is the number of RBs of the entire bandwidth. The entire bandwidth may be divided into N CQI subbands (1, 2, 3, . . . , N). One CQI subband may include k RBs defined in Table 7. If the number of RBs of the entire bandwidth is not denoted by an integer multiple of k, the number of RBs contained in the last CQI subband (i.e., the N-th CQI subband) may be determined by the following equation 1.

$$N_{RB}^{DL} - k \cdot \lfloor N_{RB}^{DL}/k \rfloor \qquad \text{[Equation 1]}$$

In Equation 1, ⊗ ⌋ represents a floor operation, and ⌊x⌋ or floor(x) represents a maximum integer not higher than 'x'.

In addition, NJ CQI subbands construct one BP, and the entire bandwidth may be divided into J BPs. UE may calculate a CQI index for one preferred Best-1 CQI subband in contained in one BP, and transmit the calculated CQI index over a PUCCH. In this case, a Best-1 indicator indicating which a Best-1 CQI subband is selected in one BP may also be transmitted. The Best-1 indicator may be composed of L bits, and L may be represented by the following equation 2.

$$L = \lceil \log_2 N_J \rceil \qquad \text{[Equation 2]}$$

In Equation 2, ⌈ ⌉ may represent a ceiling operation, and ⌈x⌉ or ceiling(x) may represent a minimum integer not higher than 'x'.

In the above-mentioned UE selected CQI reporting mode, a frequency band for CQI index calculation may be determined. Hereinafter, a CQI transmission cycle will hereinafter be described in detail.

Each UE may receive information composed of a combination of a transmission cycle of channel information and an offset from an upper layer through RRC signaling. The UE may transmit channel information to an eNB on the basis of the received channel information transmission cycle information.

Aperiodic transmission of CQI, PMI and RI over a PUSCH will hereinafter be described.

In case of the aperiodic reporting, RI and CQI/PMI may be transmitted over the same PUSCH. In case of the aperiodic reporting mode, RI reporting may be effective only for CQI/PMI reporting in the corresponding aperiodic reporting mode. CQI-PMI combinations capable of being supported to all the rank values are shown in the following table 8.

TABLE 8

| | | PMI Feedback Type | |
|---|---|---|---|
| | | No PMI (OL, TD, single-antenna) | with PMI (CL) |
| PUSCH CQI Feedback Type | Wideband (Wideband CQI) | | Mode 1-2: Multiple PMI RI<br>$1^{st}$ Wideband CQI (4 bit)<br>$2^{nd}$ Wideband CQI (4 bit) if RI > 1<br>subband PMIs on each subband |
| | UE Selected (Subband CQI) | Mode 2-0<br>RI (only for Open-Loop SM)<br>Wideband CQI (4 bit) + Best-M CQI (2 bit)<br>Best-M index<br>when RI > 1, CQI of first codeword | Mode 2-2: Multiple PMI RI<br>$1^{st}$ Wideband CQI (4 bit) + Best-M CQI(2 bit)<br>$2^{nd}$ Wideband CQI (4 bit) + Best-M CQI(2 bit) if RI > 1<br>Wideband PMI + Best-M PMI<br>Best-M index |
| | Higher layer-configured (subband CQI) | Mode 3-0<br>RI (only for Open-Loop SM)<br>Wideband CQI (4 bit) + subband CQI (2 bit)<br>when RI > 1, CQI of first codeword | Mode 3-1: Single PMI RI<br>$1^{st}$ Wideband CQI (4 bit) + subband CQI (2 bit)<br>$2^{nd}$ Wideband CQI (4 bit) + subband CQI (2 bit) if RI > 1<br>Wideband PMI |

Mode 1-2 of Table 8 may indicate a WB feedback. In Mode 1-2, a preferred precoding matrix for each subband may be selected from a codebook subset on the assumption of transmission only in the corresponding subband. The UE may report one WB CQI at every codeword, and WB CQI may be calculated on the assumption that data is transmitted on subbands of the entire system bandwidth (Set S) and the corresponding selected precoding matrix is used on each subband. The UE may report the selected PMI for each subband. In this case, the subband size may be given as shown in the following table 9. In Table 9, if the system bandwidth is set to 6 or 7, this means no application of the subband size. That is, the system bandwidth of 6 or 7 means application of only WB CQI and no subband state.

TABLE 9

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

In Table 8, Mode 3-0 and Mode 3-1 show a subband feedback configured by a higher layer (also called an upper layer).

In Mode 3-0, the UE may report a WB CQI value calculated on the assumption of data transmission on the set-S (total system bandwidth) subbands. The UE may also report one subband CQI value for each subband. The subband CQI value may be calculated on the assumption of data transmission only at the corresponding subband. Even in the case of RI>1, WB CQI and SB CQI may indicate a channel quality for Codeword 1.

In Mode 3-1, a single precoding matrix may be selected from a codebook subset on the assumption of data transmission on the set-S subbands. The UE may report one SB CQI value for each codeword on each subband. The SB CQI value may be calculated on the assumption of a single precoding matrix used in all the subbands and data transmission on the corresponding subband. The UE may report a WB CQI value for each codeword. The WB CQI value may be calculated on the assumption of a single precoding matrix used in all the subbands and data transmission on the set-S subbands. The UE may report one selected precoding matrix indicator. The SB CQI value for each codeword may be represented by a differential WB CQI value using a 2-bit subband differential CQI offset. That is, the subbband differential CQI offset may be defined as a differential value between a SB CQI index and a WB CQI index. The subband differential CQI offset value may be assigned to any one of four values {-2, 0, +1, +2}. In addition, the subband size may be given as shown in the following table 7.

In Table 8, Mode 2-0 and Mode 2-2 illustrate a UE selected subband feedback. Mode 2-0 and Mode 2-2 illustrate reporting of the best-M averages.

In Mode 2-0, the UE may select the set of M preferred subbands (i.e., best-M) from among the entire system bandwidth (set S). The size of one subband may be given as k, and k and M values for each set-S range may be given as shown in the following table 10. In Table 10, if the system bandwidth is set to 6 or 7, this means no application of both the subband size and the M value. That is, the system bandwidth of 6 or 7 means application of only WB CQI and no subband state.

The UE may report one CQI value reflecting data transmission only at the best-M subbands (i.e., M selected subbands). This CQI value may indicate a CQI for Codeword 1 even in the case of RI>1. In addition, the UE may report a WB CQI value calculated on the assumption of data transmission on the set-S subbands. The WB CQI value may indicate a CQI for Codeword 1 even in the case of RI>1.

TABLE 10

| System Bandwidth $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In Mode 2-2, the UE may select the set of M preferred subbands (i.e., best-M) from among the set-S subbands (where the size of one subband is set to k). Simultaneously, one preferred precoding matrix may be selected from among a codebook subset to be used for data transmission on the M selected subbands. The UE may report one CQI value for each codeword on the assumption that data transmission is achieved on M selected subbands and one same selection precoding matrix is used in each of the M subbands. The UE may report an indicator of one precoding matrix selected for the M subbands. In addition, one precoding matrix (i.e., a precoding matrix different from the precoding matrix for the above-mentioned M selected subbands) may be selected from among the codebook subset on the assumption that data transmission is achieved on the set-S subbands. The UE may report a WB CQI, that is calculated on the assumption that data transmission is achieved on the set-S subbands and one precoding matrix is used in all the subbands, at every codeword. The UE may report an indicator of the selected one precoding matrix in association with all the subbands.

CQI Definition

A CQI calculation method according to a 3GPP LTE system will be described in greater detail.

In calculation of a CQI value to be reported in an uplink subframe n, a UE selects a highest CQI index from among CQI index values satisfying a condition, in which a block error rate (BLER) does not exceed 10%, of CQI indices 1 to 15 of Table 11. For example, the UE assumes when one PDSCH TB occupying the CSI reference resource is transmitted and selects a highest CQI index from among CQI indices 1 to 15 that disables an error probability of the PDSCH TB to exceed 0.1. If there is no CQI index value satisfying such a condition, the UE selects CQI index 0.

TABLE 11

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Meanwhile, a resource used to calculate the CSI is referred to as a CSI reference resource. In the frequency domain, the CSI reference resource is defined as a group of downlink RBs for a band in which a CQI is calculated. When the CQI is reported in an uplink subframe n, in the time domain, a CSI reference resource is defined as a downlink subframe n-nCQI_ref.

In the case of periodic CSI reporting, a value nCQI_ref is a smallest value in which a downlink subframe n-nCQI_ref becomes a valid downlink subframe among 4 or more values.

In the case of aperiodic CSI reporting, a value nCQI_ref is a value enabling the CSI reference resource and a CSI request of an uplink DCI format to be located in the same valid downlink subframe.

In the case of aperiodic CSI reporting, when a downlink subframe n-nCQI_ref is received after a subframe having the CSI request included in the grant of a random access response and the downlink subframe n-nCQI_ref is a valid downlink subframe, nCQI_ref is 4.

The subframe (i) is set as a downlink subframe in the UE, (ii) is not an MBSFN subframe except for in transmission mode 9 or 10, (iii) does not include DwPTS when DwPTS is equal to or less than 7680 Ts, (iv) does not belong to the measurement gap for the UE, (v) belongs to a CSI subframe set associated with periodic CSI reporting when CSI subframe sets are configured in a UE in the case of periodic CSI reporting, (vi) belongs to a CSI subframe set associated with a subframe having a CSI request of DCI when TM 10 and multiple CSI processes are configured and CSI subframe sets for a CSI process are configured in the UE in the case of aperiodic CSI reporting for a CSI process, in order to become a valid downlink subframe.

If there is no valid downlink subframe for the CSI reference resource, the CSI report may be omitted.

MTC (Machine Type Communication)

MTC refers to communication between machines without human intervention. MTC may diversify services and related terminals. At present, an MTC service considered most promising is smart metering. A smart meter used for smart metering is at once a measuring device for measuring an amount of used electricity, water, gas, etc. and a transmission device for transmitting various related information through a communication network. The smart meter transmits an amount of used electricity, water, gas, etc. periodically or aperiodically to a management center through a communication network. The communication network may use a licensed band such as a cellular network or an unlicensed band such as a Wi-Fi network. For convenience, the present invention considers MTC communication over an LTE network.

At present, in LTE-A, various coverage enhancement (CE) schemes are being discussed such that an MTC UE has wide uplink/downlink coverage. For improvement of coverage of the MTC UE, repeated transmission may be used. In repeated transmission, transmission frequency may be differently set. That is, frequency hopping may be used to improve coverage of the MTC UE.

Regarding an MTC service, for example, in the case of smart metering, an MTC UE should transmit data to a base station periodically. Although a data transmission period is set by a service provider, it is assumed that the data transmission period is very long. In general, since the MTC UE mainly performs a relatively simple function, the MTC UE needs to be economically implemented. Accordingly, bandwidth available for the MTC UE is restricted regardless of actual system bandwidth available in a network, thereby reducing buffer and decoding complexity in the MTC UE.

In other words, if the MTC UE transmits or receives a signal through only a part of system bandwidth of the base station, the MTC UE may be implemented at lower cost. For example, although a system band of a specific cell is 50 RBs, if the MTC UE transmits and receives a signal through a subband of 6 RBs, complexity of the MTC UE may be reduced such that the MTC UE may be implemented at low cost. Unlike operation system bandwidth of the cell, for example, with bandwidth reduced to 1.4 MHz, uplink/downlink operation of the MTC UE may be performed. Hereinafter, a reduced band may be referred to as a narrow band or a subband.

Hereinafter, a method of performing CSI feedback when bandwidth available for an MTC UE is restricted will be described.

As a method of restricting bandwidth available for an MTC UE, the following two methods may be considered. As a first method, a specific frequency region in system bandwidth may be specified to be used by the MTC UE. As a second method, bandwidth which may be used by the MTC UE may be specified through a control channel such as a PDCCH/EPDCCH and, for example, in allocation of resources, the number of allocated RBs may be restricted.

Proposal #1

According to an embodiment, a specific frequency region in system bandwidth may be semi-statically indicated. The specific frequency region may be semi-statically indicated through system information such as SIB or RRC signaling. If an application field such as smart metering is considered, since the data size of a low-cost MTC UE is very small, the number of RBs which may be received by the MTC UE may be restricted.

Since the number of RBs which may be transmitted and received by the low-cost MTC UE is small, upon CSI feedback, a wideband CQI/wideband PMI may be reported. For example, the MTC UE may report only the wideband CQI/wideband PMI and may not support a subband CQI/subband PMI. For example, in the case of periodic CSI reporting, the base station may be restricted to configure only one of Mode 1-0 or Mode 1-1 in which the MTC UE reports only the wideband CQI/wideband PMI.

Spatial multiplexing may not be supported with respect to the low-cost MTC UE. A PMI reported by the MTC UE may be restricted to a PMI of rank 1. For example, according to the LTE system, a codebook is defined per RI. In the case of a non-MTC UE, an RI is measured and a PMI is selected from a codebook corresponding to the measured RI value and is reported. However, in the case of the MTC UE, RI=1 and a PMI may be selected only from a codebook corresponding to RI=1 and may be reported. In addition, in the case of the MTC UE, if only RI=1 is available, the MTC UE may omit an RI report.

In addition, the MTC UE may assume RI=1 even when a CQI is calculated.

Meanwhile, since a PDCCH for PDSCH transmission is transmitted through an entire system bandwidth, a wideband CQI for an entire system bandwidth may be transmitted for link adaptation of the PDCCH. This may be implemented by aperiodic CSI feedback and periodic CSI feedback.

(1) Aperiodic CSI Feedback

At present, in the LTE standard, if system bandwidth is equal to or less than 7 RBs, aperiodic CSI feedback is not supported. For example, if system bandwidth is equal to or less than 7 RBs, reporting of a CSI through a PUSCH is not supported.

In the case of the MTC UE, although the number of receivable RBs is restricted to 7 RBs or less, aperiodic CSI feedback transmitted through a PUSCH is preferably supported, because the low-cost MTC UE periodically transmits data and operates in an idle mode during the remaining time to minimize power consumption. Accordingly, aperiodic CSI feedback in which the base station requests CSI feedback only if necessary is advantageous for minimization of power consumption of the MTC UE.

According to existing aperiodic CSI feedback, as a mode for transmitting only a wideband CQI, there are Mode 1-0 (with no PMI), Mode 1-1 (with single PMI) and Mode 1-2 (with multiple PMI). In addition, Mode 2-0 for transmitting a UE-selected subband CQI and Mode 3-0 and Mode 3-1 for transmitting a higher layer configured subband CQI are supported.

Since all of Mode 2-0, Mode 3-0 and Mode 3-1 may support a subband CQI but the low-cost MTC UE may not support the subband CQI, the MTC UE may transmit a wideband CQI/wideband PMI for a specified frequency region regardless of system bandwidth in the corresponding modes. For example, the low-cost MTC UE may transmit at least one of (i) a wideband CQI for entire system bandwidth, (ii) a wideband CQI for a restricted number of RBs allocated to the low-cost MTC UE and (iii) a wideband PMI (if necessary).

In the mode for transmitting the UE-selected subband CQI, the low-cost MTC UE may transmit a wideband CQI for a restricted number of RBs allocated thereto.

The wideband CQI used by the MTC UE is different from a wideband CQI used by a legacy UE (e.g., non-MTC UE). The legacy UE measures a wideband CQI with respect to entire system bandwidth, but the MTC UE may measure a wideband CQI with respect to a restricted number of RBs allocated thereto (e.g., subbands configured for monitoring).

Figure 11:
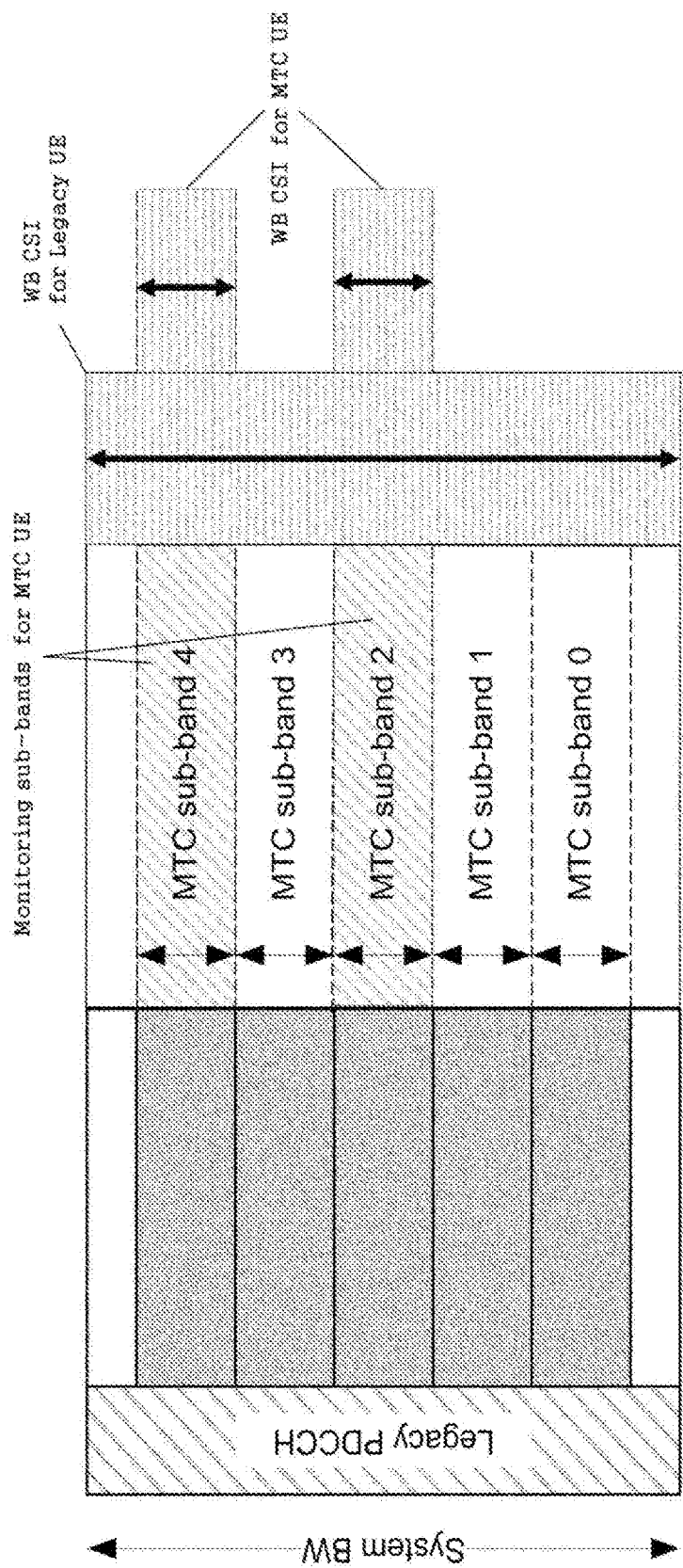
FIG. 11 is a diagram illustrating a wideband CQI of an MTC UE according to an embodiment of the present invention.

FIG. 11 is a diagram illustrating a wideband CQI of an MTC UE according to an embodiment of the present invention.

For convenience of description, assume that the entire system bandwidth includes a total of 5 MTC subbands and MTC subbands 2 and 4 are configured with respect to an MTC UE. That is, the MTC UE monitors MTC subbands 2 and 4 among a total of 5 subbands. Accordingly, the base station transmits MTC control information or data information to the MTC UE through at least one of MTC subbands 2 and 4.

As shown in FIG. 11, when a non-MTC UE measures a wideband CQI, entire system bandwidth is measured. However, when the MTC UE measures a wideband CQI, both of subbands 2 and 4, which are configured to be monitored by the MTC UE, are measured.

In a mode in which a UE transmits a UE-selected subband CQI, if only a wideband CQI/wideband PMI is restricted to be reported, the MTC UE does not need to transmit label information indicating the location of the subband selected for CQI report and differential CQI information, thereby reducing feedback overhead.

In addition, if a wideband CQI for a restricted number of RBs is defined by a differential CQI value for entire system bandwidth, feedback overhead may be further reduced.

As another method, for aperiodic CSI reporting, subband CQI feedback may be supported for the MTC UE. The subband CQI may mean that any one of subbands configured to be monitored by the MTC UE is measured. For example, in FIG. 11, when the MTC UE measures the subband CQI, a CQI for any one of subbands 2 or 4 configured to be monitored by the MTC UE may be measured. Any one subband in which the CQI is measured may be selected by the MTC UE.

If subband CQI feedback is supported, the MTC UE may not determine a subband size based on actual system bandwidth but may determine a subband size by assuming the restricted number of RBs configured with respect to the low-cost MTC UE as system bandwidth. For example, if the UE is configured to hop among n subbands having a size of 6 RBs and to receive an MTC PDCCH, it may be assumed that the size of one subband in which the CSI will be reported is 6 RBs regardless of actual system bandwidth.

Table 12 shows a subband size which may be used by the MTC UE in higher layer configured subband CQI feedback modes (e.g., mode 3-0, mode 3-1).

TABLE 12

| Restricted number of PRBs allocated to low-cost MTC | Subband size (number of RBs) |
| --- | --- |
| 6-7 | 4 |
| 8-10 | 4 |
| 11-26 | 4 |
| 27-63 | 6 |
| 64-110 | 8 |

Table 13 shows the size of the subband and the number M of subbands when the above-described method is applied to a UE-selected subband CQI feedback mode (e.g., mode 2-0).

TABLE 13

| Restricted number of PRBs allocated to low-cost MTC | Subband size (number of RBs) | M |
| --- | --- | --- |
| 6-7 | 2 | 1 |
| 8-10 | 2 | 1 |
| 11-26 | 2 | 3 |
| 27-63 | 3 | 5 |
| 64-110 | 4 | 8 |

In the above-described method, when the restricted number of RBs allocated to the MTC UE is allocated, the start points of the allocated RB and the subband may be aligned with each other. For example, as shown in FIG. 11, when the start point of the subband always coincides with the start point of the restricted number of RBs allocated to the MTC UE, the boundary of the subband and the boundary of the restricted number of RBs allocated to the UE coincide with each other. In other words, the boundary of a subband (e.g., narrow band) configured such that the MTC UE transmits and receives a signal to and from the base station and the boundary of a subband configured such that the MTC UE calculates a CSI may coincide with each other.

If the start point of the allocated RB does not coincide with the start point of the subband, the boundary of the restricted number of RBs allocated to the MTC UE is located in the middle of the subband and thus the MTC UE calculates or transmits a subband CQI twice before and after the boundary, thereby increasing the burden of the MTC UE.

(2) Periodic CSI Feedback

In periodic CSI feedback, a mode for transmitting only a wideband CQI (e.g., Mode 1-0 or Mode 1-1) may be supported. A mode (e.g., Mode 2-0 or Mode 2-1) for transmitting not only a wideband CQI but also a UE-selected subband CQI may be supported for the MTC UE.

In periodic CSI feedback, the MTC UE may transmit at least one of (i) a wideband CQI for entire system bandwidth, (ii) a wideband CQI for a restricted number of RBs and (iii) a wideband PMI (if necessary).

At this time, the wideband CQI for the restricted number of RBs may be defined as a differential CQI of a wideband CQI for entire system bandwidth. In this case, feedback overhead may be reduced.

Similarly to aperiodic CSI feedback, although system bandwidth is equal to or less than 7 RBs, Mode 2-0 and Mode 2-1 may be supported for the MTC UE. In addition, a subband size and the number of bandwidth parts (BPs) may not be determined by system bandwidth but may be determined according to the restricted number of RBs allocated to the low-cost MTC UE.

Table 14 shows a subband size and the number of BPs when UE-selected subband CQI feedback is supported for the MTC UE in periodic CSI feedback.

TABLE 14

| Restricted number of PRBs allocated to low-cost MTC | Subband size (number of RBs) | Bandwidth part |
| --- | --- | --- |
| 6-7 | 4 | 1 |
| 8-10 | 4 | 1 |
| 11-26 | 4 | 2 |
| 27-63 | 6 | 3 |
| 64-110 | 8 | 4 |

Proposal #2

According to one embodiment of the present invention, a specific frequency region in system bandwidth may be dynamically indicated through a control channel in the MTC UE. In this case, change of an existing CSI reporting mode may be minimized. The MTC UE may transmit only a wideband CQI/wideband PMI (if necessary) with respect to the restricted number of RBs allocated thereto.

(1) Aperiodic CSI Feedback

In a mode (e.g., 3-0 or 3-1) for reporting a higher layer configured subband CQI, a subband in which a CQI will be reported may be configured as the restricted number of RBs regardless of system bandwidth. In a mode (e.g., 2-0) for reporting a UE-selected subband CQI, M=1 (i.e., one subband) and a subband size may be configured as the restricted number of RBs regardless of system bandwidth.

(2) Periodic CSI Feedback

In a mode (e.g., 2-0 or 2-1) for reporting a UE-selected subband CQI, the MTC UE may configure a subband size as the restricted number of RBs regardless of system bandwidth.

In addition, if a BP is configured based on a value obtained by dividing system bandwidth by the restricted number of RBs, a CQI value for the restricted number of RBs may be always transmitted at a reporting instance. For example, when system bandwidth is 50 RBs and the restricted number of RBs is 6 RBs, if BP=9, a CQI value for 6 RBs may be transmitted every reporting instance.

Proposal #3

The MTC UE may use a CRS or a CSI-RS to calculate a CSI for repeated transmission of an MTC PDSCH. At this time, when considering that the MTC UE is located at a poor propagation environment such an interior or a basement and mobility of the MTC UE is small, channel estimation performance may deteriorate when the MTC UE uses only a CRS or CSI-RS of one valid subframe.

According to one embodiment of the present invention, for the MTC UE, a plurality of downlink subframes may be configured as one CSI reference resource and thus CSI estimation performance of the MTC UE may be improved.

In the case of periodic reporting, the MTC UE may measure a CRS or a CSI-RS transmitted in latest X1 downlink subframes (e.g., X1 valid downlink subframes) among downlink subframes located ahead by at least P (e.g., 4) subframes to perform CSI feedback. At this time, X1 may be configured with respect to the MTC UE through higher-layer signaling.

In the case of aperiodic reporting, the MTC UE may measure a CRS or a CSI-RS transmitted in latest X2 downlink subframes (e.g., X2 valid downlink subframes) among a plurality of downlink subframes including a downlink subframe, in which uplink grant is received, to perform CSI feedback. At this time, X2 may be configured with respect to the MTC UE through higher layer signaling.

Figure 12:
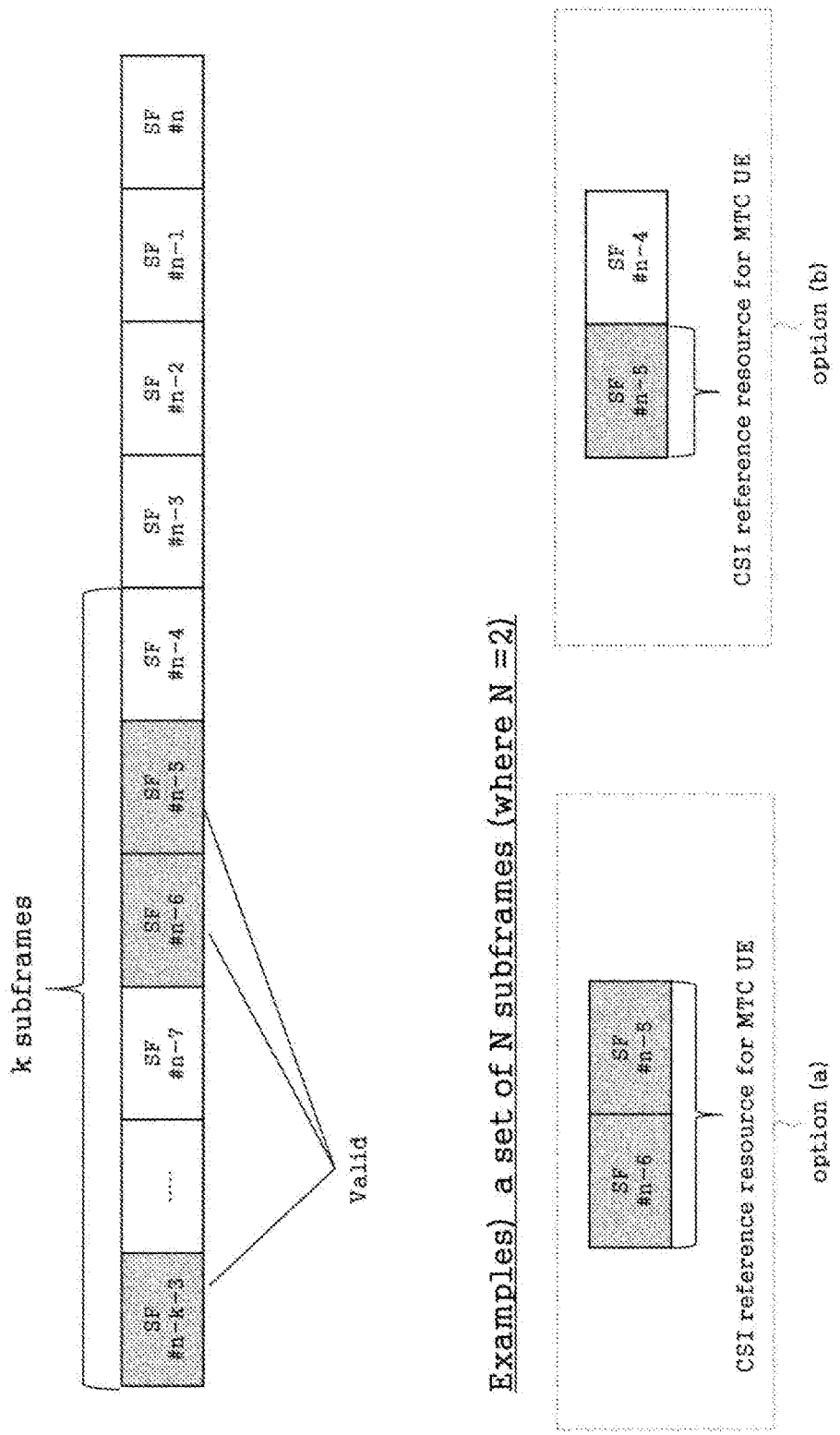
FIG. 12 is a diagram showing a set of subframes for CSI reference resources according to an embodiment of the present invention.

FIG. 12 is a diagram showing a set of subframes for CSI reference resources according to an embodiment of the present invention.

The MTC UE reports a CSI in subframe #n. For convenience, assume that, among a total of k subframes from subframe #n−4 to subframe #n−k−3, three subframes #n−5, #n−6 and #n−k−3 are valid. The MTC UE may select a set of N subframes in order to determine a CSI reference resource. In FIG. 12, for convenience, assume that N=2.

According to option (a), all N downlink subframes may be valid downlink subframes. As described above, the base station may signal a higher layer parameter for determining the number of valid subframes to be included in CSI reference resource to the MTC UE. According to the present embodiment, the higher layer parameter may be understood as indicating N.

In contrast, according to option (b), N downlink subframes may be understood as a time window for selecting a predetermined number of valid downlink subframes. For example, N downlink subframes may include invalid subframes. The MTC UE may select a predetermined number of valid downlink subframes from among the N downlink subframes as a CSI reference resource.

In either of option (a) or option (b), only valid subframes may be included in the CSI reference resource. That is, invalid subframes may not be included in the CSI reference resource. As a result, according to option (a), two valid downlink subframes may become the CSI reference resource. According to option (b), one valid downlink subframe may become a CSI reference resource. According to option 2, N subframes may be understood as a super set of valid downlink subframes to be selected as a CSI reference resource.

For example, when it is assumed that the UE reports a CSI at an uplink subframe n, the MTC UE may regard a set of a plurality of downlink subframes (e.g., a set of valid downlink subframes) as one CSI reference resource, thereby calculating a CSI (e.g., CQI). At this time, if an index of a downlink located at a last position in a set of a plurality of downlink subframes is n-nCQI_ref, nCQI_ref has a value of 4 or more. What number of downlink subframes are regarded as one CSI reference resource may be determined based on a higher layer signaled parameter.

When the MTC UE transmits and receives a signal through only a part of system bandwidth, the MTC UE may be implemented at lower cost. For example, although system bandwidth of a specific cell is 50 RBs, if the MTC UE transmits and receives a signal through a subband of 6 RBs, complexity of the MTU UE may be reduced and thus the MTC UE may be implemented at low cost.

The MTC UE may be installed in a poor propagation environment (e.g., a basement, a warehouse, etc.) and generally has relatively low mobility. In order to overcome the poor propagation environment, the MTC UE may repeatedly transmit and receive a signal. If repeated transmission and reception of the signal is performed through only the same part of system bandwidth and the frequency band is poor, performance deterioration and battery consumption of the MTC UE may increase. Accordingly, when the frequency band in which repeated transmission is performed is changed according to time, diversity gain can be obtained and the number of times of repeated transmission can be reduced. Accordingly, if repeated transmission is performed with frequency hopping, performance of the MTC UE and a battery time may increase.

When frequency hopping is configured in the MTC UE, the MTC UE may perform CSI feedback with respect to subbands supporting frequency hopping. For example, if system bandwidth includes subbands 1, 2 and 3 and a specific signal is repeatedly transmitted and received by performing frequency hopping with respect to subbands 1 and 2, the MTC UE may perform CSI feedback for subbands 1 and 2. Subband 3 may be excluded from CSI feedback.

The MTC UE may consider a method of individually performing CSI feedback with respect to subbands for frequency hopping and a method of performing feedback of one CSI with respect to all subbands for frequency hopping.

If the MTC UE individually performs CSI feedback with respect to subbands for frequency hopping, for example, if the MTC UE calculates and reports CSI 1 for subband 1 and CSI 2 for subband 2, the base station may determine an entire CSI of the MTC UE with reference to the CSI transmitted per subband. The MTC UE performing CSI feedback with respect to individual subbands may be referred to as the above-described subband CSI feedback.

If the MTC UE performs feedback of one CSI with respect to subbands for frequency hopping, the MTC UE may calculate and report one CQI/PMI value with respect to all subbands for frequency hopping. Subbands for frequency hopping may be regarded as subbands configured to be monitored by the MTC UE. In addition, the MTC UE performing CSI feedback with respect to all subbands for frequency hopping may be referred to as the above-described wideband CSI feedback. At this time, the CSI reference resource for measuring the CSI may be specified with respect to each subband. Alternatively, the MTC UE may estimate the channel of each subband using the CRS or CSI RS transmitted in the latest X3 subframes and generate one CQI/PMI value.

Meanwhile, as the number of subbands for frequency hopping increases, the CSI estimation performance of the MTC UE may deteriorate. In addition, if CSI feedback is repeatedly transmitted, CSI estimation performance may further deteriorate.

Accordingly, a measurement report for reporting an RSRP/RSRQ rather than aperiodic CSI feedback may be used instead of CSI feedback. To this end, the MTC UE may transmit information on a CQI/PMI in the measurement report for reporting the RSRP/RSRQ. At this time, information on the CQI/PMI may become the MCS index of a CQI table or the PMI index of the PMI table.

Alternatively, the MTC UE may transmit information on a downlink coverage level (e.g., CE level)/repetition number. At this time, the base station may determine the number of times of repeated transmission (e.g., if a coverage level is fed back) and an MCS level (e.g., if coverage level/repetition number is fed back) according to the coverage level/repetition level.

Proposal #4

As described above, for MTC CSI feedback, a plurality of subframes may be configured as one CSI reference resource. At this time, in order for the MTC UE to calculate a CQI, a transmission method of a PDSCH transmitted in the plurality of subframes may be determined. If a single transport block (TB) is transmitted through a plurality of subframes, repeated transmission may be considered from the viewpoint of coded bits. If repeated transmission of a PDSCH is assumed, the MTC UE may assume that a redundancy version (RV) is configured in each subframe of the CSI reference resource as follows and calculate a CQI.

(1) Assumption 1 of RV Setting

The MTC UE may assume the same RV in the respective subframes of the CSI reference resource and calculate a CQI. This may be understood as meaning that the MTC UE assumes that a PDSCH is repeatedly transmitted at the same coding rate. For example, the MTC UE may assume RV0 and calculate a CQI. As RV0, that defined in TS 36.212 may be used.

(2) Assumption 2 of RV Setting

The MTC UE may assume different RVs in the respective subframes of the CSI reference resource and calculate a CQI. In this case, the CQI may be calculated on the assumption that a PDSCH assumed to be transmitted through a plurality of subframes of the CSI reference resource is IR combined. Specifically, the following method (i) or (ii) may be considered.

(i) The MTC UE may assume that an RV (e.g., RV defined in TS 36.212) is cycled and applied to each subframe of the CSI reference resource and calculate a CQI. For example, if four subframes are configured as the CSI reference resource, the MTC UE may assume that RV0, RV1, RV2 and RV3 are applied to the respective subframes and calculate a CQI. At this time, RVs of different orders may be configured through higher layer/MAC/L1 signaling or may be defined in advance.

(ii) The MTC UE may assume that coded bits are continuously transmitted in the subframes corresponding to the CSI reference resource and calculate a CQI. For example, assume that the total size of the coded bits is N, four subframes (e.g., subframes 1, 2, 3 and 4) are configured as a CSI reference resource, and the numbers of coded bits which may be transmitted in the subframes are respectively C1, C2, C3 and C4. The base station may transmit coded bits corresponding to first C1 bits in subframe 1 among a total of N bits, transmit coded bits from C1+1 to C1+C2 in subframe 2, transmit coded bits from C1+C2+1 to C1+C2+C3 in subframe 3, and transmit coded bits from C1+C2+C3+1 to C1+C2+C3+C4 in subframe 4. At this time, if C1+C2 becomes greater than N, the base station may start transmission of the coded N bits over again (e.g., circular buffer type transmission).

(3) Assumption 3 of RV Setting

The MTC UE may assume that an RV is changed every X subframes among a plurality of subframes corresponding to a CSI reference resource and calculate a CQI. At this time, the MTC UE assumes that the same RV is maintained in X subframes. The RV may be changed every X subframes based on (i) or (ii) of assumption 2 of RV setting.

Proposal #5

As described above, M (>1) subframes may be configured as a CSI reference resource. If a CQI report is performed in an uplink subframe n, M subframes corresponding to the CSI reference resource for calculating the CQI may be set as follows. The M value may be determined based on a higher-layer signaled parameter.

M DL subframes from a subframe n-nCQI ref may be configured as a CSI reference resource. Each DL subframe of the CSI reference resource may be a valid DL subframe.

M valid DL subframes including the subframe n-nCQI ref may be configured as a CSI reference resource and the subframe n-nCQI ref may also be a valid DL subframe, without being limited thereto. For example, the M DL subframes from the subframe n-nCQI ref may be a valid subframe n-nCQI ref and M-1 DL subframes located before the valid DL subframe n-nCQI ref. In other words, the valid DL subframe n-nCQI ref may be a last subframe (i.e., a latest subframe) belonging to the CSI reference resource. For example, assume that M=3 and the valid DL subframes corresponding to the CSI reference resource are subframes n-6, n-5 and n-4. At this time, the subframe n-nCQI ref may be subframe n-4.

In contrast, the valid DL subframe n-nCQI ref may be a first subframe (i.e., an oldest subframe) belonging to the CSI reference resource. For example, assume that M=3 and the valid DL subframes corresponding to the CSI reference resource are subframes n-6, n-5 and n-4. At this time, the subframe n-nCQI ref may be subframe n-6.

The subframe n-nCQI ref may correspond to any one of the start location and end location of the subframes belonging to the CSI reference resource, and may be used as a reference subframe of the other subframes belonging to the CSI reference resource. For convenience, the subframe n-nCQI ref may be referred to as a reference downlink subframe.

Figure 13:
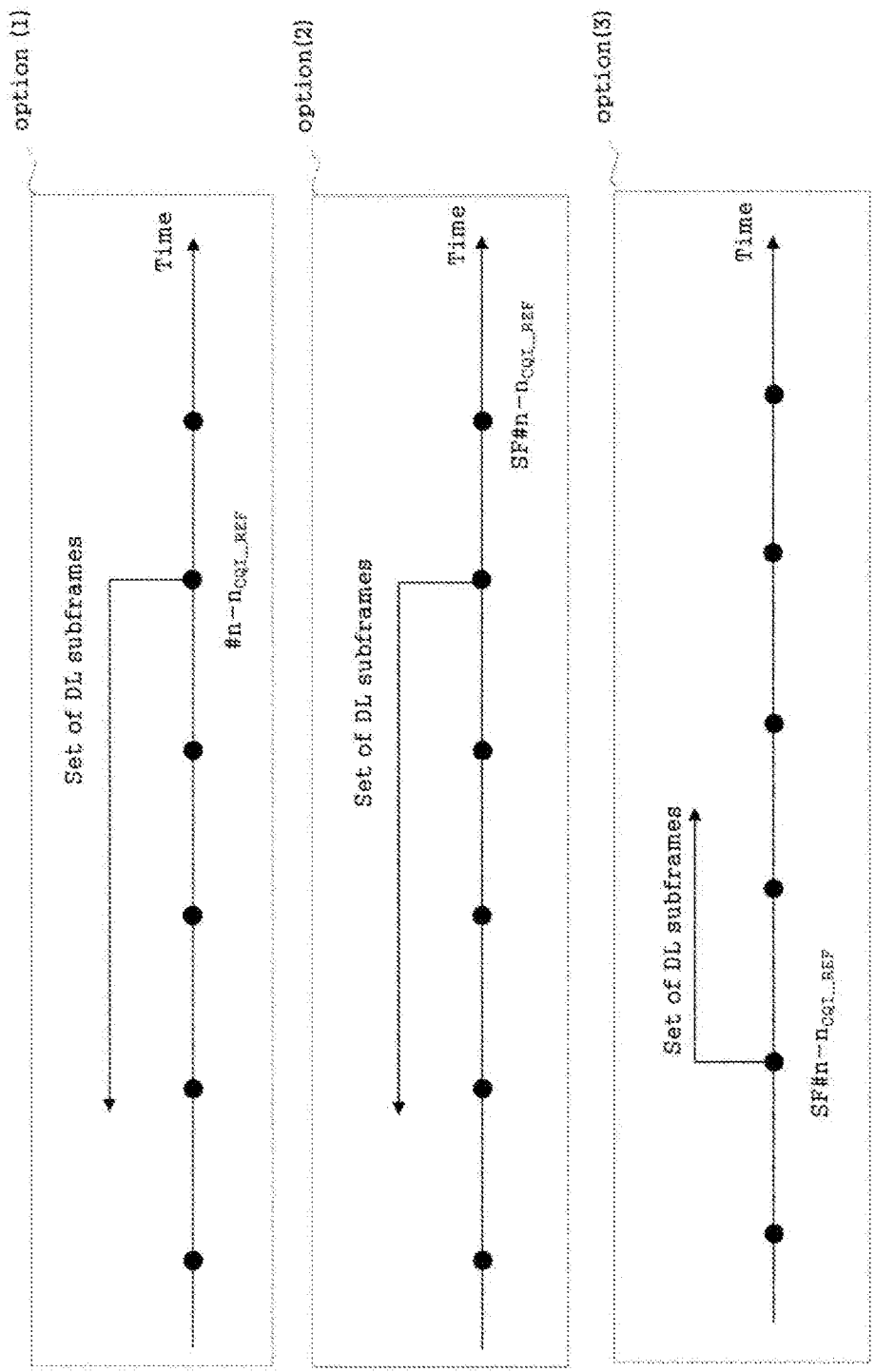
FIG. 13 is a diagram illustrating a reference downlink subframe according to an embodiment of the present invention.

FIG. 13 is a diagram illustrating a reference downlink subframe according to an embodiment of the present invention. Assume that the index of the reference downlink subframe is n-nCQI ref as described above.

According to option (1) and option (3), the reference downlink subframe is included in a set of downlink subframes for a CSI reference resource.

In contrast, according to option (2), the reference downlink subframe is excluded from the set of downlink subframes. That is, according to option (2), the set of downlink subframes may be located before the reference downlink subframe n-nCQI ref.

Specifically, according to option (1), the reference downlink subframe may be a last subframe belonging to the set of downlink subframes. For example, according to operation (1), the MTC UE may first determine the location of the reference downlink subframe n-nCQI ref, and select N downlink subframes including the reference downlink subframe backward in the time domain.

Meanwhile, as described above, the reference downlink subframe n-nCQI ref may be a valid downlink subframe. That is, nCQI ref may mean the smallest value, in which the subframe n-nCQI ref may become a valid subframe, of four or more values. For example, in FIG. 12, the reference downlink subframe may be SF #n-5.

In addition, according to option (2), the MTC UE may first determine the location of the reference downlink subframe n-nCQI ref, and select N downlink subframes located before the reference downlink subframe backward in the time domain.

In addition, according to option (3), the MTC UE may first determine the location of the reference downlink subframe n-nCQI ref, and select N downlink subframes including the reference downlink subframe forward in the time domain.

The location of the reference downlink subframe of options (1) to (3) are exemplary and the present invention is not limited thereto.

(i) In the case of periodic CSI reporting, according to option (3), nCQI ref may be the smallest value of the values equal to or greater than M+4. That is, if the subframe n-nCQI ref is a first subframe among the subframes belonging to the CSI reference resource, nCQI ref may be set to a value equal to or greater than M+4. In contrast, like option (1), if the subframe n-nCQI ref is a last subframe of the subframes belonging to the CSI reference resource, nCQI ref may be set to a value equal to or greater than 4. Meanwhile, if the number of valid DL subframes is less than M, the MTC UE may drop a CSI report.

(ii) In the case of aperiodic reporting by an aperiodic CSI request of a UL DCI format, M DL subframes from a valid DL subframe in which the UL DCI format is transmitted may be configured as a CSI reference resource. At this time, if the number of valid DL subframes is less than M, the MTC UE may drop a CSI report.

(iii) If aperiodic CSI reporting is performed by an aperiodic CSI request included in a random access grant, according to option (3), nCQI ref may be M+4. The subframe n-nCQI ref may be a valid DL subframe and may be a DL subframe after the random access grant is received. At this time, if the number of valid DL subframes is less than M, the MTC UE may drop a CSI report.

As described above, M valid DL subframes from the subframe n-nCQI ref may be defined as a CQI reference resource. At this time, nCQI ref may be set to a value suitable for selection of M valid DL subframes.

Meanwhile, according to another embodiment of the present invention, if the subframe n-nCQI ref is a valid DL subframe, the MTC UE may assume that the same M DL subframes as the subframe n-nCQI ref are present and set them as a CSI reference resource. At this time, nCQI ref may mean a smallest value enabling the subframe n-nCQI ref to become a valid DL subframe among 4 or more values.

The above-described proposals need not to be independently implemented and may be combined as one invention.

Figure 14:
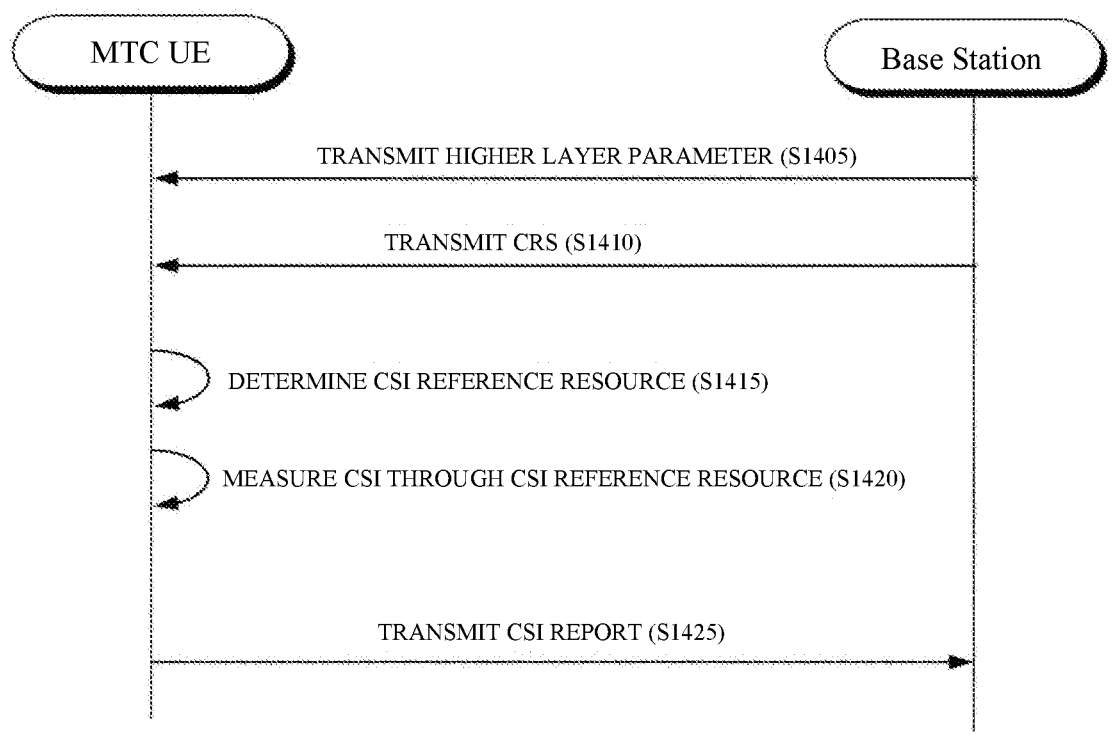
FIG. 14 is a flowchart illustrating a CSI reporting method according to an embodiment of the present invention.

FIG. 14 is a flowchart of a CSI reporting method according to an embodiment of the present invention. A repeated description will be omitted.

Referring to FIG. 14, the MTC UE receives a higher layer parameter from a base station (S1405). The higher layer parameter may be received through RRC signaling. The higher layer parameter may include a parameter used to determine the number of downlink subframes to be included in a CSI reference resource.

In addition, the MTC UE receives a CRS from the base station (S1410). In the subframe in which the CRS is received, an MTC PDCCH and/or an MTC PDSCH may also be received. The CRS may be received in a plurality of subframes. The MTC UE may perform frequency hopping with respect to a plurality of subbands. When the MTC PDCCH and/or the MTC PDSCH is monitored or received, the MTC UE may receive the MTC PDCCH and/or the MTC PDSCH from the subbands for frequency hopping.

The MTC UE determines a CSI reference resource (S1415). For example, the MTC UE may select a set of M downlink subframes as a CSI reference resource for the MTC UE. 'M' which is the number of downlink subframes to be included in the CSI reference resource may be determined based on the higher layer parameter received from the base station.

The MTC UE measures a CSI through the CSI reference resource (S1420).

CSI measurement may include a CQI (channel quality indicator). The MTC UE may measure the CQI based on a CRS (cell-specific reference signal) received through the M downlink subframes selected from the reference downlink subframe located before the uplink subframe.

The MTC UE transmits a CSI report including the CQI to the base station through an uplink subframe (S1425).

The M downlink subframes included in the CSI reference resource may be valid downlink subframes.

The reference downlink subframe may be located before the uplink subframe, in which the CSI report is transmitted, by at least four subframes.

The MTC UE may be configured to repeatedly receive an MTC signal by frequency hopping N subbands of a plurality of subbands, and the CQI may be measured with respect to all N subbands.

The MTC UE may be configured to repeatedly receive an MTC signal by frequency hopping N subbands of a plurality of subbands, and the CQI may be measured with respect to any one of N subbands.

The MTC UE may assume that the same redundancy version is applied to M downlink subframes when one PDSCH (physical downlink shared channel) transport block is repeatedly received through M downlink subframes, and measure a CQI.

The MTC UE may assume that the same redundancy version is 0 and rank between the base station and the MTC UE is always 1, and measure a CQI.

The MTC UE may select a highest CQI index from among predetermined CQI indices in which the error probability of one PDSCH transport block does not exceed 0.1, when one PDSCH transport block is repeatedly received through M downlink subframes.

Figure 15:
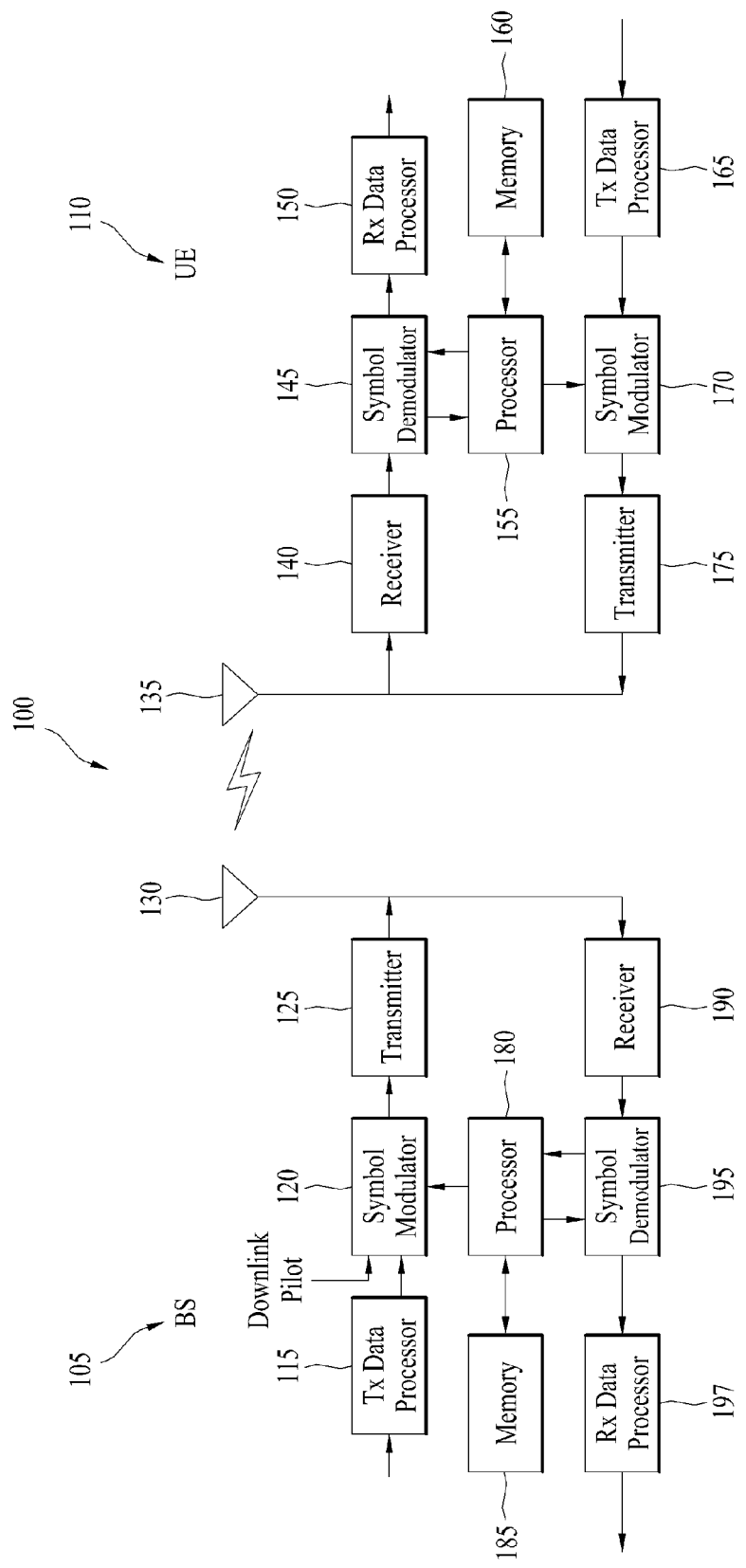
FIG. 15 is a diagram showing a base station and a UE applicable to an embodiment of the present invention.

FIG. 15 is a diagram showing a base station and a UE applicable to an embodiment of the present invention. The base station and the UE shown in FIG. 15 may perform operation according to the above-described embodiments.

Referring to FIG. 15, the base station 105 may include a transmission (Tx) data processor 115, a symbol modulator 120, a transmitter 125, a transmit/receive antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmit/receive antenna 135, a processor 155, a memory 160, a receiver 140, a symbol demodulator 155, and an Rx data processor 150. Although one antenna 130 and one antenna 135 are respectively included in the base station 105 and the UE 110, each of the base station 105 and the UE 110 includes a plurality of antennas. Accordingly, the base station 105 and the UE 110 according to the present invention support a Multiple Input Multiple Output (MIMO) system. The base station 105 and the UE 110 according to the present invention support both a Single User-MIMO (SU-MIMO) scheme and a Multi User-MIMO (MU-MIMO) scheme.

In downlink, the Tx data processor 115 receives traffic data, formats and codes the received traffic data, interleaves and modulates the coded traffic data (or performs symbol mapping), and provides modulated symbols ("data symbols"). The symbol modulator 120 receives and processes the data symbols and pilot symbols and provides a symbol stream.

The symbol modulator 120 multiplexes data and pilot signals and transmits the multiplexed data to the transmitter 125. At this time, the transmitted symbols may be data symbols, pilot symbols or zero signal values. In each symbol period, the pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols.

The transmitter 125 receives and converts the symbol stream into one or more analog signals, additionally adjusts (e.g., amplifies, filters, and frequency-up-converts) the analog signals, and generates a downlink signal suitable for transmission through a radio channel. Subsequently, the downlink signal is transmitted to the UE through the antenna 130.

In the UE 110, the receive antenna 135 receives the downlink signal from the eNB and provides the received signal to the receiver 140. The receiver 140 adjusts (e.g., filters, amplifies, frequency-down-converts) the received signal and digitizes the adjusted signal so as to acquire samples. The symbol demodulator 145 demodulates the received pilot symbols and provides the demodulated pilot symbols to the processor 155, for channel estimation.

The symbol demodulator 145 receives downlink frequency response estimation values from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps and deinterleaves) the data symbol estimation values, decodes the demodulated values, and restores transmitted traffic data.

The processes performed by the symbol demodulator 145 and the Rx data processor 150 are complementary to the processes performed by the symbol modulator 120 and the Tx data processor 115 of the base station 105.

In the UE 110, in uplink, the Tx data processor 165 processes the traffic data and provides data symbols. The symbol modulator 170 receives the data symbols, multiplexes the data symbols, performs modulation with respect to the symbols and provides a symbol stream to the transmitter 175. The transmitter 175 receives and processes the symbol stream, generates an uplink signal, and transmits the uplink signal to the base station 105 through the transmit antenna 135.

The base station 105 receives the uplink signal from the UE 110 through the receive antenna 130 and the receiver 190 processes the received uplink signal and acquires samples. Subsequently, the symbol demodulator 195 processes the samples and provides pilot symbols received in the uplink and data symbol estimation values. The Rx data processor 197 processes the data symbol estimation values and restores traffic data transmitted from the UE 110.

The respective processors 155 and 180 of the UE 110 and the base station 105 instruct (e.g., control, adjust, manages, etc.) the respective operations of the UE 110 and the base station 105. The processors 155 and 180 may be connected to the memories 160 and 185 for storing program codes and data. The memories 160 and 185 may be respectively connected to the processors 155 and 180 so as to store operating systems, applications and general files.

Each of the processors 155 and 180 may also be referred to as a controller, a microcontroller, a microprocessor, a microcomputer, etc. The processors 155 and 180 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 155 and 180.

If the embodiments of the present invention are implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be driven by the processors 155 and 180.

Layers of the radio interface protocol between the UE and the eNB in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The UE and the eNB exchange RRC messages with each other through a wireless communication network and the RRC layer.

In the present specification, although the processor 155 of the UE and the processor 180 of the base station perform process signals and data except for a data transmission/reception function and a storage function of the UE 110 and the base station 105, for convenience of description, the processors 155 and 180 are not specially described. Although the processors 155 and 180 are not specially described, the processors 155 and 180 may perform a series of operations such as data processing except for a signal transmission/reception function and a storage function.

According to one embodiment of the present invention, a UE may support MTC. A processor of the UE may select a set of M downlink subframes as a CSI reference resource for the MTC UE and measure a channel quality indicator (CQI) through the CSI reference resource. A transmitter may transmit a CSI report including the CQI to a base station through an uplink subframe. The number M of downlink subframes to be included in the CSI reference resource may be determined based on a higher layer parameter received from the base station. The processor may measure the CQI based on a cell-specific reference signal (CRS) received through the M downlink subframes selected from a reference downlink subframe located before the uplink subframe.

According to one embodiment of the present invention, a base station may receive channel state information (CSI) reporting from a machine type communication (MTC) user equipment (UE). A transmitter may transmit a cell-specific reference signal (CRS) through downlink subframes, under control of a processor. A receiver may receive a CSI report including a channel quality indicator (CQI) measured in a CSI reference resource from the MTC UE through an uplink subframe, under control of the processor. The CSI reference resource may be configured by M downlink subframes among the downlink subframes in which the CRS is transmitted. The number M of downlink subframes included in the CSI reference resource may be determined based on a higher layer parameter received from the base station. The CQI may be measured based on a cell-specific reference signal (CRS) received through the M downlink subframes selected from a reference downlink subframe located before the uplink subframe.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

As described above, the embodiments of the present invention are applicable to various wireless communication systems including a 3GPP based wireless communication system.

What is claimed is:

1. A method of reporting channel state information (CSI) at a machine type communication (MTC) user equipment (UE) in a wireless communication system, the method comprising:
    selecting a set of M downlink subframes as a CSI reference resource and a subband among a set of N subbands;
    measuring a wideband channel quality indicator (CQI) for the set of N subbands and a subband CQI for the subband through the CSI reference resource; and
    transmitting, to a base station, the wideband CQI and the subband CQI through an uplink subframe,
    wherein the MTC UE measures the wideband CQI and the subband CQI based on a cell-specific reference signal (CRS) received through the M downlink subframes which are located before the uplink subframe, and
    wherein the set of N subbands is configured to perform frequency hopping.

2. The method according to claim 1, wherein the M which is the number of the downlink subframes to be included in the CSI reference resource is determined based on a higher layer parameter received from the base station.

3. The method according to claim 1, wherein the M downlink subframes included in the CSI reference resource are valid downlink subframes.

4. The method according to claim 1, wherein the reference downlink subframe is located before the uplink subframe by at least four subframes.

5. The method according to claim 1, wherein the measuring of the wideband CQI comprises:
    measuring the wideband CQI by assuming that a same redundancy version is applied to the M downlink subframes when one physical downlink shared channel (PDSCH) transport block is repeatedly received through the M downlink subframes.

6. The method according to claim 5, wherein the measuring of the wideband CQI comprises:
    measuring the wideband CQI by assuming that the same redundancy version is 0 and rank between the base station and the MTC UE is always 1.

7. The method according to claim 6, wherein the measuring of the wideband CQI comprises:
    selecting a highest CQI index value from among predetermined CQI indices in which an error probability of the PDSCH transport block does not exceed 0.1, when the PDSCH transport block is repeatedly received through the M downlink subframes.

8. A machine type communication (MTC) user equipment (UE) for reporting channel state information (CSI) in a wireless communication system, the MTC UE comprising:
    a processor configure to select a set of M downlink subframes as a CSI reference resource and a subband among a set of N subbands, and
    measure a wideband channel quality indicator (CQI) for the set of N subbands and a subband CQI for the subband through the CSI reference resource; and
    a transmitter configured to transmit, to a base station, the wideband CQI and the subband CQI through an uplink subframe through an uplink subframe,
    wherein the MTC UE measures the wideband CQI and the subband CQI based on a cell-specific reference signal (CRS) received through the M downlink subframes which are located before the uplink subframe, and
    wherein the set of N subbands is configured to perform frequency hopping.

9. A method of receiving a channel state information (CSI) report at a base station from a machine type communication (MTC) user equipment (UE) in a wireless communication system, the method comprising:
    transmitting, to the MTC UE, a cell-specific reference signal (CRS) through M downlink subframes; and
    receiving, from the MTC UE, a wideband channel quality indicator (CQI) and a subband CQI through an uplink subframe,
    wherein the wideband CQI for a set of N subbands and the subband CQI for a subband are measured by the MTC UE through a CSI reference resource,
    wherein the wideband CQI and the subband CQI are measured, by the MTC UE, based on the CRS transmitted through the M downlink subframes which are located before the uplink subframe,
    wherein a set of the M downlink subframes is selected as the CSI reference resource and the subband is selected from among the set of N subbands, and
    wherein the set of N subbands is configured to perform frequency hopping.

10. The method according to claim 9, wherein the M which is the number of the downlink subframes to be included in the CSI reference resource is determined based on a higher layer parameter received from the base station.

11. The method according to claim 9, wherein the M downlink subframes included in the CSI reference resource are valid downlink subframes.

12. The method according to claim 9, wherein the reference downlink subframe is located before the uplink subframe by at least four subframes.

13. The method according to claim 9, wherein the wideband CQI is measured by assuming that a same redundancy version is applied to the M downlink subframes when one physical downlink shared channel (PDSCH) transport block is repeatedly transmitted through the M downlink subframes.

14. The method according to claim 13, wherein the same redundancy version is 0, and the wideband CQI is measured by assuming that rank between the base station and the MTC UE is always 1.

15. The method according to claim 14, wherein the PDSCH transport block is repeatedly received through the M downlink subframes, and the wideband CQI is measured based on a highest CQI index value is selected from among predetermined CQI indices in which an error probability of the PDSCH transport block does not exceed 0.1.

* * * * *